United States Patent
Paek et al.

(10) Patent No.: US 12,479,836 B2
(45) Date of Patent: Nov. 25, 2025

(54) SPHINGOSINE-1-PHOSPHATE RECEPTOR AGONIST, PREPARATION METHOD THEREFOR, AND PHARMACEUTICAL COMPOSITION CONTAINING SAME AS ACTIVE INGREDIENT

(71) Applicant: LG CHEM, LTD., Seoul (KR)

(72) Inventors: Seung Yup Paek, Daejeon (KR); Deok Seong Park, Daejeon (KR); Sang Yong Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 811 days.

(21) Appl. No.: 17/780,908

(22) PCT Filed: Nov. 20, 2020

(86) PCT No.: PCT/KR2020/016468
§ 371 (c)(1),
(2) Date: May 27, 2022

(87) PCT Pub. No.: WO2021/112461
PCT Pub. Date: Jun. 10, 2021

(65) Prior Publication Data
US 2023/0047472 A1 Feb. 16, 2023

(30) Foreign Application Priority Data
Dec. 3, 2019 (KR) ........................ 10-2019-0159309

(51) Int. Cl.
C07D 405/14 (2006.01)
A61P 37/02 (2006.01)
C07D 405/12 (2006.01)

(52) U.S. Cl.
CPC ............ *C07D 405/14* (2013.01); *A61P 37/02* (2018.01); *C07D 405/12* (2013.01)

(58) Field of Classification Search
CPC ...... C07D 405/12; C07D 405/14; A61P 37/02
See application file for complete search history.

(56) References Cited

U.S. PATENT DOCUMENTS

| | | |
|---|---|---|
| 8,193,378 B2 | 6/2012 | Harada et al. |
| 10,166,250 B2 | 1/2019 | Thomas et al. |
| 2005/0014725 A1 | 1/2005 | Mi et al. |
| 2005/0124654 A1 | 6/2005 | Groneberg et al. |
| 2007/0185152 A1 | 8/2007 | Yamashita et al. |
| 2007/0225275 A1 | 9/2007 | Allison et al. |
| 2008/0096938 A1 | 4/2008 | Evindar et al. |
| 2008/0200535 A1 | 8/2008 | Ohmori et al. |
| 2009/0048224 A1 | 2/2009 | Groneberg et al. |
| 2009/0076070 A1 | 3/2009 | Harada et al. |
| 2009/0131400 A1 | 5/2009 | Mi et al. |
| 2009/0253760 A1 | 10/2009 | Lynch et al. |
| 2009/0275554 A1 | 11/2009 | Habashita et al. |
| 2010/0009936 A1 | 1/2010 | Evindar et al. |
| 2010/0105679 A1 | 4/2010 | Guzzo et al. |
| 2010/0113796 A1 | 5/2010 | Ahmed |
| 2010/0168159 A1 | 7/2010 | Harada et al. |
| 2011/0105432 A1 | 5/2011 | Habashita et al. |
| 2011/0230463 A1 | 9/2011 | Harada et al. |
| 2012/0178735 A1 | 7/2012 | Harada et al. |
| 2012/0190649 A1 | 7/2012 | Thomas et al. |
| 2014/0023636 A1 | 1/2014 | Habashita et al. |
| 2014/0088079 A1 | 3/2014 | Choi et al. |
| 2014/0135311 A1 | 5/2014 | Allison et al. |
| 2014/0309190 A1 | 10/2014 | Thomas et al. |
| 2015/0152075 A1 | 6/2015 | Choi et al. |
| 2015/0376173 A1 | 12/2015 | Paek et al. |
| 2016/0129023 A1 | 5/2016 | Thomas et al. |
| 2016/0318942 A1 | 11/2016 | Allison et al. |
| 2017/0239280 A1 | 8/2017 | Thomas et al. |
| 2018/0133233 A1 | 5/2018 | Thomas et al. |
| 2019/0209592 A1 | 7/2019 | Thomas et al. |

FOREIGN PATENT DOCUMENTS

| | | |
|---|---|---|
| CN | 102239164 A | 11/2011 |
| CN | 105051037 A | 11/2015 |
| EA | 17406 B1 | 12/2012 |
| EP | 1826197 A1 | 8/2007 |
| JP | 2006-522825 A | 10/2006 |
| JP | 2006-528698 A | 12/2006 |
| JP | 2014-515396 A | 6/2014 |
| JP | 2016-513126 A | 5/2016 |
| KR | 10-2009-0007740 A | 1/2009 |

(Continued)

OTHER PUBLICATIONS

International Search Report issued for International Application No. PTC/KR2020/016468 on Feb. 26, 2021, 8 pages.
Bastin R.J. et al. Salt selection and optimisation procedures for pharmaceutical new chemical entities. Organic process research & development, 2000, vol. 4, No. 5, pp. 427-435.
Belikov V.G., Pharmaceutical Chemistry, Manual, Fourth edition, Moscow, publishing house "MEDpress-inform", 2007, pp. 27-29 with partial English Translation (6 pages).
Enhancing NIH Research on Autoimmune Disease. National Academies of Sciences, Engineering, and Medicine. Washington, DC: The National Academies Press, 2022, p. 156.

(Continued)

*Primary Examiner* — Erich A Leeser
(74) *Attorney, Agent, or Firm* — ROTHWELL, FIGG, ERNST & MANBECK, P.C.

(57) ABSTRACT

The present invention relates to a novel compound represented by Formula 1, functioning as a sphingosine-1-phosphate receptor agonist useful for treating autoimmune disorders, a preparation method therefor, a pharmaceutical composition containing the same as an active ingredient, and a use. The compound according to the present invention has an effect in extensive autoimmune diseases and chronic inflammatory diseases, including relapsing-remitting multiple sclerosis, and can also be used for treating or preventing immunoregulatory disorders.

13 Claims, No Drawings

(56) References Cited

FOREIGN PATENT DOCUMENTS

| KR | 10-2009-0033912 A | | 4/2009 | |
|---|---|---|---|---|
| KR | 10-2011-0091865 A | | 8/2011 | |
| KR | 10-2014-0104376 | * | 8/2014 | ......... A61K 31/4245 |
| KR | 10-2014-0104376 A | | 8/2014 | |
| KR | 10-1939657 B1 | | 1/2019 | |
| WO | 2005-085227 A1 | | 9/2005 | |
| WO | 2008-064320 A2 | | 5/2008 | |
| WO | 2008-086404 A1 | | 7/2008 | |
| WO | 2010-064707 A1 | | 6/2010 | |
| WO | 2014-129796 A1 | | 8/2014 | |

OTHER PUBLICATIONS

Baecher-Allan C. et al., Multiple Sclerosis: Mechanisms and Immunotherapy, Neuron, 2018, vol. 97, Issue 4, pp. 742-768.
Fundamentals of medical prevention. Educational and methodological manual for students and cadets of advanced training courses of state professional educational institutions. Novosibirsk, 2016, 206 pages, pp. 13-21, with partial English translation (13 pages).

* cited by examiner

SPHINGOSINE-1-PHOSPHATE RECEPTOR AGONIST, PREPARATION METHOD THEREFOR, AND PHARMACEUTICAL COMPOSITION CONTAINING SAME AS ACTIVE INGREDIENT

CROSS-REFERENCE TO RELATED APPLICATIONS

This application is a 35 U.S.C. 371 National Phase Entry Application from PCT/KR2020/016468 filed on Nov. 20, 2020, which claims the benefit of priority based on Korean Patent Application No. 10-2019-0159309, filed on 3 Dec. 2019, the entire disclosures of which are incorporated as part of the specification.

TECHNICAL FIELD

The present invention relates to a novel compound functioning as a sphingosine-1-phosphate receptor agonist useful for treating autoimmune disorders such as multiple sclerosis, a preparation method therefor, and a pharmaceutical composition containing the same as an active ingredient.

BACKGROUND OF THE INVENTION

S1P (sphingosine-1-phosphate) is produced via an intracellular ceramide pathway, in which ceramide is the starting material. Ceramide is produced via two pathways, the first of which is de novo biosynthetic pathway. Ceramide is also produced by the degradation of sphingomyelin, a cell membrane constituent, in a cell. The S1P level in each tissue is controlled by two biosynthetic sphingosine kinases (SphKs) and two biodegradable S1P phosphatases (S1P lyase and lysophospholipid phosphatases). S1P, produced via phosphorylation of sphingosine by sphingosine kinase, is known to mediate various cellular responses, such as cell proliferation, cytoskeletal organization and migration, adherence- and tight junction assembly, and morphogenesis. S1P exists as a combined form with other plasma proteins, including albumin, at a high level (100-1000 nM) in plasma, while it is at a low level in tissues.

S1P binds with the S1P receptor, a G-protein coupled receptor, to show various biological functions. As S1P receptor sub-types, S1P1-S1P5 are known up to now and are named endothelial differentiation gene (EDG) receptors 1, 5, 3, 6, and 8, respectively. The S1P receptors are known to be involved in various biological functions such as leukocyte recirculation, neural cell proliferation, morphological changes, migration, endothelial function, vasoregulation, and cardiovascular development.

In recent years, many studies have found that the S1P signaling process via these receptors plays an important role in a series of responses related to multiple sclerosis, including inflammation response and the repair process, and a non-selective SP agonist has been recently and actually approved as a therapeutic agent for multiple sclerosis. The S1P receptors are extensively expressed in many cells related to the induction of multiple sclerosis. Especially, the S1P1 receptor plays a very important role in the immune system. The S1P1 receptor is mainly expressed on the surface of lymphocytes such as T cells and B cells and responds to S1P, resulting in involvement in recirculation of lymphocytes. In normal conditions, the S1P concentration is higher in body fluid than in lymphoid tissue, and therefore lymphocytes leave lymphoid tissue by the difference of S1P concentration to circulate along efferent lymph. However, when the S1P1 receptor in lymphocytes is down-regulated by an S1P1 agonist, the egress of lymphocytes from lymphoid tissue does not occur, resulting in reduced infiltration of autoaggressive lymphocytes, which cause inflammation and tissue damage in the central nervous system (CNS). As a result, a therapeutic effect on multiple sclerosis is obtained. Fingolimod, a non-selective SP1 agonist, has been approved as an oral medication for treating multiple sclerosis. When it binds to the S1P1 receptor and is activated, the receptor becomes degraded or internalized from the surface of lymphocytes. Thus, fingolimod acts as a functional S1P1 antagonist paradoxically.

BRIEF SUMMARY OF THE INVENTION

Specifically, an aspect of the present invention provides a novel compound having a superior effect on sphingosine-1-phosphate (hereinafter, it may be abbreviated as "S1P") receptor, a pharmaceutically acceptable salt, isomers, or solvates thereof.

Another aspect of the present invention provides a method for preparing the novel compound.

Still another aspect of the present invention provides a sphingosine-1-phosphate receptor agonist composition, the composition containing the novel compound, pharmaceutically acceptable salts, isomers, or solvates thereof as an active ingredient, and a pharmaceutically acceptable carrier.

Particularly, the composition of the present invention has a superior effect on preventing and treating autoimmune disorders, such as multiple sclerosis.

According to an aspect of the present invention, there is provided a compound represented by Formula 1, a pharmaceutically acceptable salt, or a stereoisomer thereof:

[Formula 1]

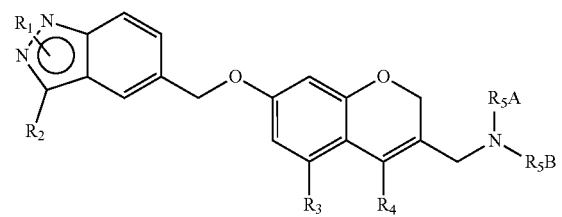

wherein $R_1$ is hydrogen, or a substituted or unsubstituted alkyl, alkenyl, or alkynyl;

$R_2$ is hydrogen, a substituted or unsubstituted alkyl, halogen, CN, $CF_3$, or $COCF_3$;

$R_3$ and $R_4$ are each independently hydrogen, a substituted or unsubstituted alkyl, alkenyl, alkynyl, or halogen;

$R_5A$ and $R_5B$ are each independently hydrogen, a substituted or unsubstituted alkyl, alkenyl, alkynyl, or —$R_6$(COOH), wherein $R_6$ is a single bond, a substituted or unsubstituted alkylene, alkenylene, or alkynylene, and any one of $R_5A$ and $R_5B$ is —$R_6$(COOH); and $R_5A$ and $R_5B$ may bind to each other to form a ring, which is substituted with —$R_6$(COOH).

According to another aspect of the present invention, there is also provided a compound, a pharmaceutically acceptable salt, or a stereoisomer thereof for use in the treatment of autoimmune disorders, including multiple sclerosis.

According to another aspect of the present invention, there is also provided a compound, a pharmaceutically acceptable salt, or a stereoisomer thereof, which is a sphingosine-1-phosphate receptor agonist.

According to another aspect of the present invention, there is also provided a pharmaceutical composition for use in the treatment of autoimmune disorders, wherein the pharmaceutical composition includes a compound represented by Formula 1, a pharmaceutically acceptable salt, or a stereoisomer thereof.

According to another aspect of the present invention, there is also provided a pharmaceutical composition for use in the treatment or prevention of autoimmune diseases or chronic inflammatory diseases selected from the group consisting of systemic lupus erythematosus, chronic rheumatoid arthritis, inflammatory bowel diseases, multiple sclerosis, amyotrophic lateral sclerosis (ALS), arteriosclerosis, atherosclerosis, scleroderma and autoimmune hepatitis, the pharmaceutical composition includes a compound represented by Formula 1, a pharmaceutically acceptable salt, or a stereoisomer thereof as an active ingredient.

Advantageous Effects

The compound of Formula 1 according to the present invention acts as a sphingosine-1-phosphate receptor agonist and thus has an effect in extensive autoimmune diseases and chronic inflammatory diseases, including relapsing-remitting multiple sclerosis, and can also be used for treating or preventing immunoregulatory disorders.

DETAILED DESCRIPTION OF THE INVENTION

Hereinafter, the present invention will be described in detail with reference to the drawings. The terms or words used in the description and claims shall not be interpreted as being limited to ordinary or dictionary meanings and the terms or words should be interpreted as meanings and concepts consistent with the technical idea of the present invention, based on the principle that an inventor may properly define the concept of a term to explain his own invention in the best way.

Herein, unless conveniently indicated otherwise, the term "compound of Formula 1" refers to all of the compounds of Formula 1, including pharmaceutically acceptable salts, isomers, or solvates thereof.

Throughout the specification, the terms used in the definition of the compound of Formula 1 are defined as follows. Unless specially indicated otherwise, the following definition applies to the terms used individually or as a part of a bigger group throughout the specification.

In the chemical formulae, a vertical wave sign means the position bonded to the parent nucleus of the compound.

The term "alkyl," when used alone or in combination such as "heteroalkyl," each means a straight-chain, branched-chain, or cyclic (cycloalkyl) hydrocarbon radical and is preferably a straight-chain or branched-chain saturated hydrocarbon radical having 1 to 10 carbon atoms; a saturated cyclic hydrocarbon radical having 3 to 10 carbon atoms; or a saturated cyclic hydrocarbon radical having 3 to 10 carbon atoms combined with a straight-chain and/or branched-chain saturated hydrocarbon radical having 1 to 10 carbon atoms.

The term "alkenyl" means an unsaturated hydrocarbon radical containing at least one double bond, and when used alone or in combination such as "heteroalkenyl", each means a straight-chain, branched-chain, or cyclic (cycloalkenyl) hydrocarbon radical. It is preferably a straight-chain or branched-chain unsaturated hydrocarbon radical having 1 to 10 carbon atoms and containing at least one double bond; an unsaturated cyclic hydrocarbon radical having 3 to 10 carbon atoms and containing at least one double bond; or an unsaturated cyclic hydrocarbon radical containing at least one double bond and having 3 to 10 carbon atoms combined with a straight-chain and/or branched-chain unsaturated hydrocarbon radical having 1 to 10 carbon atoms and containing at least one double bond.

The term "halogeno-alkyl" means an alkyl of which one or more hydrogen atoms are substituted with halogen.

The term "alkynyl" means an unsaturated hydrocarbon radical containing at least one triple bond, and when used alone or in combination such as "heteroalkynyl", each means a straight-chain, branched-chain, or cyclic (cycloalkynyl) hydrocarbon radical.

The term "alkoxy" means an —O-alkyl, in which the alkyl is as defined above.

The term "halo(gen)" means a substituent selected from fluoro, chloro, bromo and iodo groups. The other terms and abbreviations used herein have their original meanings, unless defined otherwise.

The term "substituent" means an atom or group of atoms which replaces one or more hydrogen atoms on the parent chain, and examples may include one or more selected from the group consisting of halogen, cyano, hydroxy, an alkyloxy having 1 to 10 carbon atoms, oxo (=O), and a sulfonyl unsubstituted or substituted with an alkyl. In addition, in the present invention, the term "substituted" means that one or more hydrogen atoms may be substituted with the substituents.

In addition, the alkyl, alkenyl, alkynyl, and alkyloxy, which have 1 to 10 carbon atoms, may preferably have 1 to 6 carbon atoms.

In addition, the cycloalkyl, cycloalkenyl, and cycloalkynyl, which have 3 to 10 carbon atoms, may preferably have 3 to 6 carbon atoms.

The compound according to the present invention may form pharmaceutically acceptable salts. The pharmaceutically acceptable salts include acid-addition salts which are formed from inorganic acids, such as hydrochloric acid, sulfuric acid, nitric acid, phosphoric acid, hydrobromic acid, and hydroiodic acid; organic acids, such as tartaric acid, formic acid, citric acid, acetic acid, trichloroacetic acid, trifluoroacetic acid, gluconic acid, benzoic acid, lactic acid, fumaric acid, and maleic acid; or sulfonic acids, such as methanesulfonic acid, benzenesulfonic acid, p-toluenesulfonic acid, or naphthalene-sulfonic acid, which form non-toxic acid-addition salts containing pharmaceutically acceptable anions. Particularly, preferable acid-addition salts are formed from sulfuric acid, methanesulfonic acid, or halogen acid. The compound of Formula 1 according to the present invention can be converted into its salt by conventional methods.

Furthermore, since the compounds of Formula 1 according to the present invention can have an asymmetric carbon center, they can exist as R- or S-isomers, racemic mixtures, or diastereoisomer mixtures and each diastereoisomer, all of which are within the scope of the present invention. That is, in case the compounds of Formula 1 include asymmetric carbon atom(s), they are construed as including all stereoisomers, unless the configuration is indicated specifically.

According to an aspect of the present invention, there is provided a compound represented by Formula 1, a pharmaceutically acceptable salt, or a stereoisomer thereof:

[Formula 1]

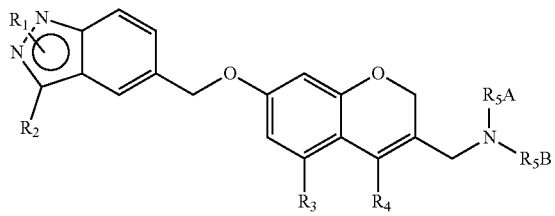

wherein $R_1$ may be hydrogen, or a substituted or unsubstituted alkyl, alkenyl, or alkynyl; $R_2$ may be hydrogen, a substituted or unsubstituted alkyl, halogen, CN, $CF_3$, or $COCF_3$; $R_3$ and $R_4$ may be each independently hydrogen, a substituted or unsubstituted alkyl, alkenyl, alkynyl, or halogen; $R_5A$ and $R_5B$ may be each independently hydrogen, a substituted or unsubstituted alkyl, alkenyl, alkynyl, or —$R_6$(COOH), wherein $R_6$ may be a single bond, a substituted or unsubstituted alkylene, alkenylene, or alkynylene, and any one of $R_5A$ and $R_5B$ may be —$R_6$(COOH); and $R_5A$ and $R_5B$ may bind to each other to form a ring, which may be substituted with —$R_6$(COOH).

Specifically, in Formula 1, $R_1$ may be hydrogen or a substituted or unsubstituted alkyl; $R_2$ may be hydrogen, a substituted or unsubstituted alkyl, halogen, or $CF_3$; $R_3$ and $R_4$ may be each independently hydrogen, an unsubstituted alkyl, or halogen; $R_5A$ and $R_5B$ may be each independently a substituted or unsubstituted alkyl, or —$R_6$(COOH), wherein $R_6$ may be a single bond or a substituted or unsubstituted alkylene group, and any one of $R_5A$ and $R_5B$ may be —$R_6$(COOH); $R_5A$ and $R_5B$ may bind to each other to form a ring, which may be substituted with —$R_6$(COOH).

In addition, in Formula 1, when $R_5A$ and $R_5B$ bind to each other to form a ring, the ring may be substituted with —$R_6$(COOH) and additionally with one or more substituents selected from the group consisting of halogen, an alkyl, and halogeno-alkyl.

In addition, in Formula 1, when $R_5A$ and $R_5B$ bind to each other to form a ring, the ring may be a ring represented by Formula 1-1:

[Formula 1-1]

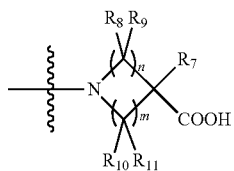

wherein N is the same as N bound to $R_5A$ and $R_5B$ in Formula 1; $R_7$ to $R_{11}$ may be each independently hydrogen, a substituted or unsubstituted alkyl, halogen, or halogeno-alkyl; and m and n may be each independently an integer between 0 and 6, and m+n may be ≥1.

Specifically, the ring represented by Formula 1-1 may be a ring represented by Formula 1-2:

[Formula 1-2]

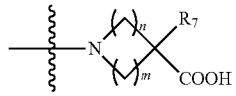

wherein $R_7$ may be hydrogen, a substituted or unsubstituted alkyl, or halogeno-alkyl; and N, n and m are as defined in Formula 1-1.

In addition, in Formula 1, when $R_5A$ and $R_5B$ form a ring, the ring may be specifically any one of azetidine, pyrrolidine, piperidine, or azepane, which are substituted with —$R_6$(COOH); and the ring may be substituted with an additional substituent other than —$R_6$(COOH) or unsubstituted.

In addition, in accordance with an exemplary embodiment of the present invention, in Formula 1, at least one of $R_3$ and $R_4$ may be hydrogen. For example, $R_3$ and $R_4$ both may be hydrogen.

More specifically, the compound represented by Formula 1 may include a compound selected from the following group:

{[7-(3-chloro-1-isopropyl-1H-indazol-5-yl methoxy)-2H-chromene-3-ylmethyl]-methyl-amino}-acetic acid;

1-[7-(3-chloro-1-isopropyl-1H-indazol-5-yl methoxy)-2H-chromene-3-ylmethyl]-azetidin-3-carboxylic acid;

1-[7-(3-chloro-2-propyl-2H-indazol-5-yl methoxy)-2H-chromene-3-ylmethyl]-azetidin-3-carboxylic acid;

1-[7-3-chloro-1-isopropyl-1H-indazol-5-yl methoxy)-2H-chromene-3-ylmethyl]-piperidine-4-carboxylic acid;

(R)-1-[7-(3-chloro-1-isopropyl-1H-indazol-5-yl methoxy)-2H-chromene-3-ylmethyl]-piperidine-3-carboxylic acid;

(S)-1-[7-(3-chloro-1-isopropyl-1H-indazol-5-yl methoxy)-2H-chromene-3-ylmethyl]-piperidine-3-carboxylic acid;

(S)-1-[7-(3-chloro-1-isopropyl-1H-indazol-5-yl methoxy)-2H-chromene-3-ylmethyl]-pyrrolidine-3-carboxylic acid;

1-[7-(3-chloro-1-isopropyl-1H-indazol-5-yl methoxy)-2H-chromene-3-ylmethyl]-3-chloromethyl-azetidine-3-carboxylic acid;

(R)-1-[7-(3-chloro-1-isopropyl-1H-indazol-5-yl methoxy)-2H-chromene-3-ylmethyl]-pyrrolidine-3-carboxylic acid;

1-[7-(3-chloro-1-isopropyl-1H-indazol-5-yl methoxy)-4-methyl-2H-chromene-3-ylmethyl]-piperidine-4-carboxylic acid;

1-[4-chloro-7-(3-chloro-1-isopropyl-1H-indazol-5-yl methoxy)-2H-chromene-3-ylmethyl]-piperidine-4-carboxylic acid;

1-[7-(3-chloro-1-isopropyl-1H-indazol-5-yl methoxy)-5-fluoro-2H-chromene-3-ylmethyl]-piperidine-4-carboxylic acid;

1-[7-(1-isopropyl-3-trifluoromethyl-1H-indazol-5-yl methoxy)-2H-chromene-3-ylmethyl]-piperidine-4-carboxylic acid;

1-[7-(1-isopropyl-3-ethyl-1H-indazol-5-yl methoxy)-2H-chromene-3-ylmethyl]-piperidine-4-carboxylic acid;

1-[7-(3-chloro-1-isopropyl-1H-indazol-5-yl methoxy)-2H-chromene-3-ylmethyl]-azepane-4-carboxylic acid;

1-[7-(3-chloro-1-propyl-1H-indazol-5-yl methoxy)-2H-chromene-3-ylmethyl]-azetidine-3-carboxylic acid;

1-[7-(3-chloro-1-propyl-1H-indazol-5-yl methoxy)-2H-chromene-3-ylmethyl]-piperidine-4-carboxylic acid;

1-[7-(3-chloro-1-cyclopropylmethyl-1H-indazol-5-yl methoxy)-2H-chromene-3-ylmethyl]-piperidine-4-carboxylic acid;

1-[7-(3-chloro-1-cyclopentyl-1H-indazol-5-yl methoxy)-5-fluoro-2H-chromene-3-ylmethyl]-piperidine-4-carboxylic acid;

1-[7-(3-chloro-1-isobutyl-1H-indazol-5-yl methoxy)-5-fluoro-2H-chromene-3-ylmethyl]-piperidine-4-carboxylic acid;

1-[7-(3-chloro-1-isobutyl-1H-indazol-5-yl methoxy)-5-fluoro-2H-chromene-3-ylmethyl]-azepane-4-carboxylic acid; and 2-{1-[7-(1-isopropyl-3-trifluoromethyl-1H-indazol-5-yl methoxy)-2H-chromene-3-ylmethyl]-piperidine-4-yl}acetic acid.

The compound of formula 1 according to the present invention, a pharmaceutically acceptable salt, an isomer thereof, or a solvate thereof is suitable for the treatment or prevention of sphingosine-1-phosphate receptor related diseases.

The present invention also provides a pharmaceutical composition functioning as a sphingosine-1-phosphate receptor agonist, the pharmaceutical composition includes an effective amount of the compound of Formula 1, a pharmaceutically acceptable salt, an isomer of, or a solvate thereof, and a pharmaceutically acceptable carrier.

The pharmaceutical composition of the present invention can also be used for the treatment or prevention of diseases caused by undesired lymphocyte infiltration related to sphingosine-1-phosphate.

Exemplary diseases, which can be treated by the pharmaceutical composition according to the present invention, include extensive autoimmune diseases and chronic inflammatory diseases, including relapsing-remitting multiple sclerosis.

The pharmaceutical composition of the present invention can also be used for the treatment or prevention of immunoregulatory disorders. Herein, the immunoregulatory disorders include systemic lupus erythematosus, chronic rheumatoid arthritis, inflammatory bowel diseases, multiple sclerosis, amyotrophic lateral sclerosis (ALS), arteriosclerosis, atherosclerosis, scleroderma, and autoimmune hepatitis.

In addition, the present invention provides a method for preparing the composition for preventing or treating extensive autoimmune diseases and chronic inflammatory diseases, including relapsing-remitting multiple sclerosis, the method including a step for mixing the compound of Formula 1, a pharmaceutically acceptable salt, an isomer, or a solvate thereof, as an active component, and a pharmaceutically acceptable carrier.

According to the present invention, the "pharmaceutical composition" can include other components such as diluents, carriers, etc., in addition to the active component of the present invention. Accordingly, said pharmaceutical composition can include pharmaceutically acceptable carriers, diluents, excipients or combinations thereof as necessary. The pharmaceutical composition facilitates the administration of compounds into an organism. Various methods for administering the compounds exist and include, but are not limited to, oral, injection, aerosol, parenteral and local administration.

The term "carrier" means a compound that facilitates the addition of compounds into the cell or tissue. For example, dimethylsulfoxide (DMSO) is a conventional carrier facilitating the introduction of many organic compounds into the cells or tissues in an organism.

The term "diluent" means a compound that not only stabilizes a biologically active form of a compound of interest but is also diluted in water dissolving the compound. Dissolved salts in a buffer solution are used as diluents in this field. A conventionally used buffer solution is phosphate buffered saline mimicking a salt form of the human body fluid. Since a buffer solution can control the pH of a solution at low concentration, a buffer diluent hardly modify the biological activity of the compound.

The term "pharmaceutically acceptable" means a property of the carrier, diluent, or the like, that does not impair the biological activities and physical properties of the compound.

The compound according to the present invention can be formulated as various pharmaceutical dosage forms depending on the purpose. In the preparation of the pharmaceutical composition of the present invention, an active ingredient—specifically, the compound of Formula 1, or a pharmaceutically acceptable salt, an isomer thereof, or a solvate thereof—is mixed with selected pharmaceutically acceptable carriers considering the dosage form to be prepared. For example, the pharmaceutical composition of the present invention can be formulated as preparations for injection, oral preparations, and the like, depending on the purpose.

The compounds of the present invention can be formulated by conventional methods using known pharmaceutical carriers and excipients, and inserted into a unit dose form or a multi-dose container. The preparation may be a solution, a suspension, or an emulsion in oil or aqueous medium and include conventional dispersing agents, suspending agents, or stabilizing agents. In addition, the preparation may be, for example, a dry powder form, which is used by dissolving in sterilized, pyrogen-free water before use. The compound of the present invention can be formulated into suppositories by using a conventional suppository base, such as cocoa butter or other glycerides. Solid dosage forms for oral administration include capsules, tablets, pills, powders, and granules. Particularly, capsules and tablets are preferred. Tablets and pills are preferably enteric-coated. Solid dosage forms may be manufactured by mixing the compound of the present invention with at least one inert diluent(s), such as sucrose, lactose, or starch, and carriers, such as lubricants, e.g., magnesium stearate, disintegrating agents, binders, and the like.

The compound or the pharmaceutical composition containing the same, according to the present invention, can be administered alone or in combination with other drugs, for example, other immune therapeutics, as required.

The dosage of the compound of Formula 1 according to the present invention is determined according to the doctor's prescription, concerning factors such as the sex, body weight, age of a patient, and the special nature and severity of the disease. A typical dosage for adults is in the range of about 0.1 to 500 mg per day according to the frequency and intensity of administration. For a typical daily dosage of intramuscular or intravenous administration for adults, which can be administered in divided unit dosages, the range of about 0.1 to 300 mg per day may be sufficient. For some patients, a higher daily dose may be preferred.

The term "treatment" means stopping or delaying the progress of diseases in a subject exhibiting symptoms of diseases. The term "prevention" means stopping or delaying the sign of diseases in a subject at risk of exhibiting symptoms of diseases, even if he or she does not exhibit the symptoms.

The present invention is explained in more detail by the following Preparation Examples and Examples. However, the scope of the present invention is not limited by them. When preparing the compound of the present invention, it is possible to appropriately change the reaction sequence. That is, it is possible to run first optional processes or insert optional processes to change substituents, and use any reagents other than the exemplified reagents as needed. Compounds obtained in each process can be separated or purified by conventional methods, such as recrystallization, distillation, or silica gel column chromatography. Furthermore, the compound obtained in each process can be used in the next step without further purification or separation.

In the following structural formulae, unless indicated otherwise, all substituents are as previously defined. Reagents and starting materials can be obtained readily commercially. Others can be produced by synthetic methods described in the following Preparation Examples and Examples, including known synthetic methods for structurally similar compounds. Unless otherwise noted, compounds used as starting materials are known ones or those which can be prepared by known synthetic methods or similar methods from known compounds.

In the following, M means molar concentration, N means normal concentration, and "room temperature" means 1 to 40° C.

Preparation Example 1-1: Synthesis of 7-hydroxy-2H-chromene-3-carbaldehyde

The title compound was obtained according to the method described in International Patent Publication No. 2010-064707.

NMR: $^1$H-NMR (400 HMz, CDCl$_3$); δ 9.51 (s, 1H), 7.40 (m, 5H), 7.19 (s, 1H), 7.11 (d, 1H), 6.60 (dd, 1H), 6.49 (d, 1H), 5.10 (s, 2H), 5.00 (s, 2H)

Preparation Example 1-2: Synthesis of (3-chloro-1-isopropyl-1H-indazol-5-yl)-methanol The title compound was obtained according to the method described in Korean Registered Patent No. 10-1939657.

NMR: $^1$H-NMR (400 HMz, CDCl$_3$); δ 7.64 (s, 1H), 7.43 (m, 2H), 4.79 (m, 3H), 1.83 (brs, 1H), 1.56 (d, 6H)

Preparation Example 1-3: Synthesis of 7-(3-chloro-1-isopropyl-1H-indazol-5-ylmethoxy)-2H-chromene-3-carbaldehyde (3-Chloro-1-isopropyl-1H-indazol-5-yl)-methanol (383 mg, 1.70 mmol) obtained from Preparation Example 1-2 and 7-hydroxy-2H-chromene-3-carbaldehyde (300 mg, 1.70 mmol) obtained from Preparation Example 1-1 were dissolved in toluene (10 mL), and then tributylphosphine (BuP$_3$, 291 mg, 1.44 mmol) and 1,1'-(azodicarbonyl)dipiperidine (ADD, 363 mg, 1.44 mmol) were added dropwise thereto. After stirring the mixture at room temperature for 18 hours, an excess amount of hexane was added thereto. The mixture was filtered, and the filtrate was distilled under reduced pressure. The residue was purified by column chromatography to obtain the title compound (320 mg, 49%).

NMR: $^1$H-NMR (400 HMz, CDCl$_3$); δ 9.52 (s, 1H), 7.71 (s, 1H), 7.47 (dd, J=1.6 Hz, 1H), 7.44 (d, 1H), 7.21 (s, 1H), 7.14 (d, 1H), 6.62 (dd, J=2.4 Hz, 1H), 6.52 (d, 1H), 5.16 (s, 2H), 5.03 (s, 2H), 4.83-4.76 (m, 1H), 1.57 (d, 6H)

Preparation Example 1-4: Synthesis of {[7-(3-chloro-1-isopropyl-1H-indazol-5-ylmethoxy)-2H-chromene-3-ylmethyl]-methyl-amino}-acetic acid ethyl ester 7-(3-Chloro-1-isopropyl-1H-indazol-5-ylmethoxy)-2H-chromene-3-carbaldehyde (160 mg, 0.42 mmol) obtained from Preparation Example 1-3 and sarcosine ethyl ester hydrochloride (129 mg, 0.84 mmol) were dissolved in dichloroethane (10 mL), and sodium triacetoxy borohydride (46 mg, 0.22 mmol) was added thereto. The mixture was stirred for 5 hours at room temperature. After completion of the reaction, the reactant was added with water and extracted with ethyl acetate. The extract was dried with anhydrous magnesium sulfate and filtered. The filtrate was distilled under reduced pressure. The residue was separated by column chromatography to obtain the title compound (90 mg, 45%).

NMR: $^1$H-NMR (400 HMz, CDCl$_3$); MR (400 HMz, CDCl extract was dried with anhydrous magnesium sulfadd, J=2.4 Hz, 1H), 6.53 (d, 1H), 6.32 (s, 1H), 5.16 (s, 2H), 4.87-4.80 (m, 3H), 4.21 (q, 2H), 3.29 (s, 2H), 3.24 (s, 2H), 2.42 (s, 3H), 1.62 (d, 6H), 1.30 (t, 3H)

Example 1: Synthesis of {[7-(3-chloro-1-isopropyl-1H-indazol-5-ylmethoxy)-2H-chromene-3-ylmethyl]-methyl-amino}-acetic acid

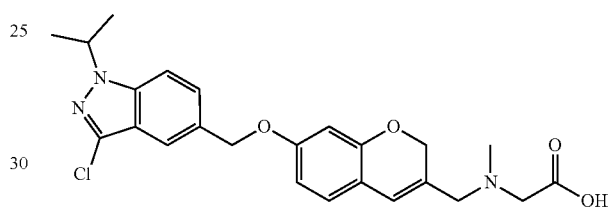

{[7-(3-Chloro-1-isopropyl-1H-indazol-5-ylmethoxy)-2H-chromene-3-ylmethyl]-methyl-amino}-acetic acid ethyl ester (90 mg, 0.19 mmol) obtained from Preparation Example 1-4 was dissolved in a mixed solution of tetrahydrofuran and methanol (2/1, 20 ml), and 6 N sodium hydroxide aqueous solution (1 ml, 6.32 mmol) was slowly added dropwise thereto. The mixture was stirred for 3 hours at room temperature, added with 1 N hydrochloric acid solution, and extracted with ethyl acetate. The extract was washed with brine, dried with anhydrous magnesium sulfate and filtered. The filtrate was distilled under reduced pressure to obtain the title compound (40 mg, 46%).

NMR: $^1$H-NMR (400 MHz, CDCl$_3$) δ 7.68 (s, 1H), 7.43 (q, 2H), 6.93 (d, 1H), 6.53 (d, 1H), 6.48 (d, 2H), 5.10 (s, 2H), 4.82 (s, 2H), 4.80-4.76 (m, 1H), 3.56 (s, 2H), 3.49 (s, 2H), 2.67 (s, 3H), 1.56 (d, 6H)

Preparation Example 2: Synthesis of 1-[7-(3-chloro-1-isopropyl-1H-indazol-5-ylmethoxy)-2H-chromene-3-ylmethyl]-azetidin-3-carboxylic acid methyl ester According to the method described in Preparation Example 1-4, 7-(3-chloro-1-isopropyl-1H-indazol-5-ylmethoxy)-2H-chromene-3-carbaldehyde (160 mg, 0.42 mmol) obtained from Preparation Example 1-3 and azetidin-3-carboxylic acid methyl ester hydrochloride (127 mg, 0.84 mmol) were used to obtain the title compound (120 mg, 60%).

NMR: $^1$H-NMR (400 HMz, CDCl$_3$); δ 7.69 (s, 1H), 7.47 (dd, 1H), 7.41 (d, 1H), 6.87 (d, 1H), 6.51 (dd, 1H), 6.46 (d, 1H), 6.25 (s, 1H), 5.11 (s, 2H), 4.76 (m, 1H), 4.68 (s, 2H), 3.71 (s, 3H), 3.55 (m, 2H), 3.32 (m, 3H), 3.11 (s, 2H), 1.57 (d, 6H)

Example 2: Synthesis of 1-[7-(3-chloro-1-isopropyl-1H-indazol-5-ylmethoxy)-2H-chromene-3-ylmethyl]-azetidin-3-carboxylic acid

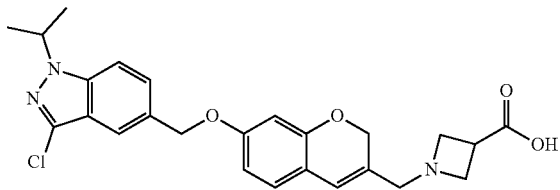 [SMILES: CC(C)n1nc(Cl)c2cc(COc3ccc4c(c3)OCC(CN3CC(C(=O)O)C3)=C4)ccc21]

According to the method described in Example 1, 1-[7-(3-chloro-1-isopropyl-1H-indazol-5-ylmethoxy)-2H-chromene-3-ylmethyl]-azetidin-3-carboxylic acid methyl ester (120 mg, 0.25 mmol) obtained from Preparation Example 2 was used to obtain the title compound (70 mg, 60%).

NMR: $^1$H-NMR (400 MHz, CDCl$_3$) δ 7.71 (s, 1H), 7.44 (q, 2H), 6.98 (d, 1H), 6.63 (s, 1H), 6.578 (d, 1H), 6.50 (s, 1H), 5.12 (s, 2H), 4.87 (s, 2H), 4.84-4.80 (m, 1H), 4.27 (br, s, 2H), 4.18 (br, s, 2H), 3.76 (s, 2H), 3.67 (br, s, 1H), 1.60 (d, 6H)

Preparation Example 3-1: Synthesis of 1H-indazol-5-carboxylic acid methyl ester

4-Amino-3-methyl-benzoic acid methyl ester (2.0 g, 12.03 mmol) was dissolved in chloroform (25 mL) and then acetic anhydride (2.12 g, 30.07 mmol) was slowly added dropwise thereto at 0° C. The mixture was stirred for 1 hour at room temperature, and potassium acetate (250 mg, 3.61 mmol) and isoamyl nitrite (2.23 mL, 24.06 mmol) were added thereto. The mixture was stirred under reflux for 18 hours at 70° C. and added with excess dichloromethane. The mixture was washed with saturated sodium hydrogen carbonate aqueous solution, dried with anhydrous magnesium sulfate and filtered. The filtrate was distilled under reduced pressure. The residue was separated by column chromatography to obtain the intermediate acetyl indazole (1.2 g, 5.50 mmol).

The obtained acetyl indazole (1.2 g, 5.50 mmol) was dissolved in a mixed solution of tetrahydrofuran and methanol (1/1, 20 mL) and then 6 N sodium hydroxide aqueous solution (1.8 mL) was added dropwise thereto. The mixture was stirred for 10 minutes at room temperature and acidified with 6 N hydrochloric acid aqueous solution. The mixture was extracted with dichloromethane. The extract was dried with anhydrous magnesium sulfate and distilled under reduced pressure to obtain the title compound (1.0 g, 47%).

NMR: $^1$H-NMR (400 HMz, CDCl$_3$); δ 9.72 (br, s, 1H), 8.59 (s, 1H), 8.27 (s, 1H), 8.14 (dd, J=1.2 Hz, 1H), 7.60 (d, 1H), 3.97 (s, 3H)

Preparation Example 3-2: Synthesis of 1-propyl-1H-indazol-5-carboxylic acid methyl ester and 2-propyl-2H-indazol-5-carboxylic methyl ester 1H-indazol-5-carboxylic acid methyl ester (1.0 g, 5.68 mmol) obtained from Preparation Example 3-1 was dissolved in dimethylformamide (20 mL), and propyl bromide (0.6 mL, 6.23 mmol) and sodium hydride (205 mg, 8.56 mmol) were slowly added dropwise thereto at 0° C. The mixture was stirred at 50° C. for 8 hours. Then, 1 N hydrochloric acid solution was added thereto, and extraction with ethyl acetate was carried out. The extract was washed with brine, dried with anhydrous magnesium sulfate and filtered. The filtrate was distilled under reduced pressure. The residue was separated by column chromatography to obtain 1-propyl-1H-indazol-5-carboxylic acid methyl ester (680 mg, 55%) and 2-propyl-2H-indazol-5-carboxylic acid methyl ester (330 mg, 26%), which passed through column chromatography first.

NMR: $^1$H-NMR (500 HMz, CDCl$_3$); δ 8.31 (s, 1H), 7.96 (d, 1H), 7.29 (d, 1H), 4.20 (t, 2H), 3.86 (s, 3H), 1.87 (q, 2H), 0.84 (t, 3H) (NMR data of 1-propyl-1H-indazol-5-carboxylic acid methyl ester)

NMR: $^1$H-NMR (500 HMz, CDCl$_3$); δ 8.49 (s, 1H), 8.05 (s, 1H), 7.89 (dd, J=1.8 Hz, 1H), 7.70 (d, 1H), 4.39 (t, 2H), 3.93 (s, 3H), 2.06 (q, 2H), 0.96 (t, 3H) (NMR data of 2-propyl-2H-indazol-5-carboxylic acid methyl ester)

Preparation Example 3-3: Synthesis of 3-chloro-2-propyl-2H-indazol-5-carboxylic acid methyl ester 1-Propyl-1H-indazol-5-carboxylic acid methyl ester and 2-propyl-2H-indazol-5-carboxylic acid methyl ester (330 mg, 1.51 mmol) obtained from Preparation Example 3-1 were dissolved in dimethylformamide, and N-chlorosuccinimide (NCS, 253 mg, 1.90 mmol) was added dropwise. The mixture was stirred for 18 hours at room temperature. Then, water was added thereto, and extraction with ethyl acetate was carried out. The extract was washed with brine, dried with anhydrous magnesium sulfate and filtered. The filtrate was distilled under reduced pressure. The residue was separated by column chromatography to obtain the title compound (180 mg, 47%).

NMR: $^1$H-NMR (400 HMz, CDCl$_3$); δ 8.45 (s, 1H), 7.96 (dd, J=1.6 Hz, 1H), 7.69 (dd, J=1.2 Hz, 1H), 4.47 (t, 2H), 3.99 (s, 3H), 2.08 (q, 2H), 1.03 (t, 3H)

Preparation Example 3-4: Synthesis of (3-chloro-2-propyl-2H-indazol-5-yl)-methanol 3-Chloro-2-propyl-2H-indazol-5-carboxylic acid methyl ester (180 mg, 0.71 mmol) obtained from Preparation Example 3-3 was dissolved in tetrahydrofuran, and then lithium aluminium borohydride (8 mg, 0.20 mmol) was added dropwise thereto. The mixture was stirred for 1 hour at room temperature, sequentially added with water (1 mL), 6N sodium hydroxide aqueous solution (1 mL), and water (3 mL), and filtered with Celite. The filtrate was distilled under reduced pressure. The residue was separated by column chromatography to obtain the title compound (159 mg, 100%).

Preparation Example 3-5: Synthesis of 7-(3-chloro-2-propyl-2H-indazol-5-ylmethoxy)-2H-chromene-3-carbaldehyde According to the method described in Preparation Example 1-3, (3-chloro-2-propyl-2H-indazol-5-yl)-methanol (159 mg, 0.71 mmol) obtained from Preparation Example 3-4 and 7-hydroxy-2H-chromene-3-carbaldehyde (125 mg, 0.71 mmol) obtained from Preparation Example 1-1 were used to obtain the title compound (130 mg, 48%).

NMR: $^1$H-NMR (500 HMz, CDCl$_3$); δ 9.49 (s, 1H), 7.66 (d, 1H), 7.59 (s, 1H), 7.32 (dd, J=1.85, 1.25, 1H), 7.21 (s,

1H), 7.13 (d, 1H), 6.61 (dd, J=2.45 Hz, 1H), 6.51 (d, 1H), 5.12 (s, 2H), 5.02 (s, 2H), 4.41 (t, 2H), 2.01 (q, 2H), 0.96 (t, 3H)

Preparation Example 3-6: Synthesis of 1-[7-(3-chloro-2-propyl-2H-indazol-5-ylmethoxy)-2H-chromene-3-ylmethyl]-azetidin-3-carboxylic acid methyl ester According to the method described in Preparation Example 1-4, 7-(3-chloro-2-propyl-2H-indazol-5-ylmethoxy)-2H-chromene-3-carbaldehyde (130 mg, 0.34 mmol) obtained from Preparation Example 3-5 and azetidin-3-carboxylic acid methyl ester hydrochloride (103 mg, 0.68 mmol) were used to obtain the title compound (100 mg, 62%).

NMR: ¹H-NMR (400 HMz, CDCl₃); δ 7.65 (d, 1H), 7.59 (s, 1H), 7.33 (d, 1H), 6.87 (d, 1H), 6.52 (dd, J=2.4 Hz, 1H), 6.47 (d, J=2.4 Hz, 1H), 6.25 (s, 1H), 5.07 (S, 2H), 4.69 (s, 2H), 4.41 (t, 2H), 3.71 (s, 3H), 3.52 (t, 2H), 3.33-3.27 (m, 3H), 3.10 (s, 2H), 2.01 (q, 2H), 0.97 (t, 3H)

Example 3: Synthesis of 1-[7-(3-chloro-2-propyl-2H-indazol-5-ylmethoxy)-2H-chromene-3-ylmethyl]-azetidin-3-carboxylic acid

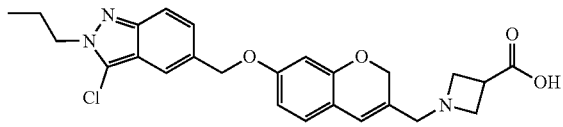 [SMILES: CCCn1nc2ccc(COc3ccc4c(c3)OCC(CN3CC(C(=O)O)C3)=C4)cc2c1Cl]

According to the method described in Example 1, 1-[7-(3-chloro-2-propyl-2H-indazol-5-ylmethoxy)-2H-chromene-3-ylmethyl]-azetidin-3-carboxylic acid methyl ester (100 mg, 0.33 mmol) obtained from Preparation Example 3-6 was used to obtain the title compound (30 mg, 19%).

NMR: ¹H-NMR (500 MHz, CDCl₃) δ 7.61 (d, 1H), 7.53 (d, 1H), 7.27 (br, s, 1H), 6.90 (d, 1H), 6.50 (br, s, 2H), 6.43 (s, 1H), 4.98 (s, 2H), 4.74 (s, 2H), 4.38 (t, 2H), 4.19-4.02 (m, 4H), 3.64 (br, s, 2H), 3.47 (br, s, 1H). 1.97 (q, 2H), 0.93 (t, 3H)

Preparation Example 4-1: Synthesis of 1-[7-(3-chloro-1-isopropyl-1H-indazol-5-ylmethoxy)-2H-chromene-3-ylmethyl]-piperidin-4-carboxylic acid ethyl ester According to the method described in Preparation Example 1-4, 7-(3-chloro-1-isopropyl-1H-indazol-5-ylmethoxy)-2H-chromene-3-carbaldehyde (178 mg, 0.46 mmol) obtained from Preparation Example 1-3 and piperidin-4-carboxylic acid ethyl ester hydrochloride (110 mg, 0.69 mmol) were used to obtain the title compound (100 mg, 41%).

NMR: ¹H-NMR (400 HMz, CDCl₃); δ 7.66 (s, 1H), 7.43 (d, 1H), 7.37 (d, 1H), 6.82 (d, 1H), 6.45 (m, 2H), 6.20 (s, 1H), 5.05 (s, 2H), 4.73 (m, 3H), 4.10 (m, 1H), 2.95 (s, 2H), 2.81 (m, 2H), 2.23 (m, 1H), 1.94 (t, 2H), 1.84 (m, 2H), 1.71 (m, 2H), 1.52 (d, 6H), 1.21 (t, 3H)

Example 4: Synthesis of 1-[7-(3-chloro-1-isopropyl-1H-indazol-5-ylmethoxy)-2H-chromene-3-ylmethyl]-piperidin-4-carboxylic acid

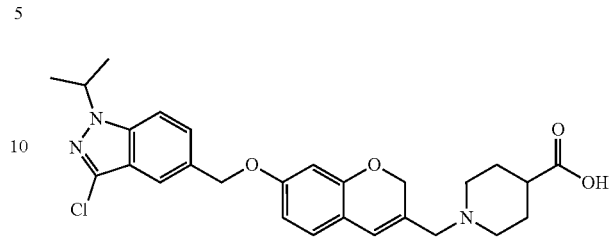

According to the method described in Example 1, 1-[7-(3-chloro-1-isopropyl-1H-indazol-5-ylmethoxy)-2H-chromene-3-ylmethyl]-piperidin-4-carboxylic acid ethyl ester (100 mg, 0.19 mmol) obtained from Preparation Example 4-1 was used to obtain the title compound (48 mg, 51%).

NMR: ¹H-NMR (400 HMz, CDCl₃); δ 7.73 (s, 1H), 7.48 (m, 2H), 6.92 (d, 1H), 6.54 (m, 2H), 6.36 (s, 1H), 5.14 (s, 2H), 4.83 (m, 3H), 3.27 (s, 2H), 3.17 (m, 2H), 2.32 (m, 1H), 2.21 (m, 2H), 2.03 (m, 2H), 1.87 (m, 2H), 1.61 (d, 6H)

Preparation Example 5-1: Synthesis of (R)-1-[7-(3-chloro-1-isopropyl-1H-indazol-5-ylmethoxy)-2H-chromene-3-ylmethyl]-piperidin-3-carboxylic acid ethyl ester According to the method described in Preparation Example 1-4, 7-(3-chloro-1-isopropyl-1H-indazol-5-ylmethoxy)-2H-chromene-3-carbaldehyde (143 Mg, 0.37 mmol) obtained from Preparation Example 1-3 and (R)-piperidin-3-carboxylic acid ethyl ester hydrochloride (88 Mg, 0.56 mmol) were used to obtain the title compound (105 Mg, 53%).

NMR: ¹H-NMR (400 HMz, CDCl₃); δ 7.70 (s, 1H), 7.47 (d, 1H), 7.41 (d, 1H), 6.87 (d, 1H), 6.50 (dd, J=2.4 Hz, 1H), 6.47 (d, 1H), 6.24 (s, 1H), 5.11 (s, 2H), 4.83-4.75 (m, 1H), 4.73 (s, 2H), 4.13 (q, 2H), 3.00 (q. 2H), 2.87 (d, 1H), 2.67 (d, 1H), 2.53 (br, s, 1H), 2.22 (br, s, 1H), 2.01 (br, s, 1H), 1.88 (br, s, 1H), 1.71 (br, s, 1H), 1.57 (d, 6H), 1.24 (t, 3H)

Example 5: Synthesis of (R)-1-[7-(3-chloro-1-Isopropyl-1H-indazol-5-ylmethoxy)-2H-chromene-3-ylmethyl]-piperidin-3-carboxylic acid

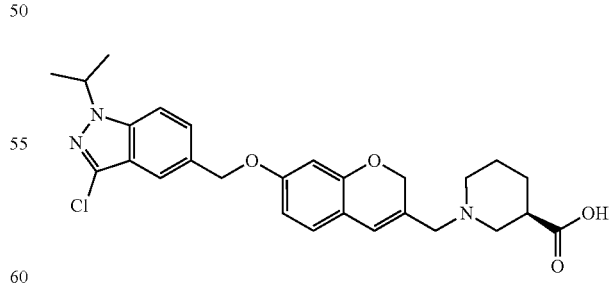

According to the method described in Example 1, (R)-1-[7-(3-chloro-1-isopropyl-1H-indazol-5-ylmethoxy)-2H-chromene-3-ylmethyl]-piperidin-3-carboxylic acid ethyl ester (105 mg, 0.20 mmol) obtained from Preparation Example 5-1 was used to obtain the title compound (66 mg, 66%).

NMR: ¹H-NMR (400 HMz, DMSO$_{d6}$); δ 7.80 (d, 1H), 7.72 (s, 1H), 7.54 (dd, J=1.2 Hz, 1H), 7.08 (d, 1H), 6.70 (s, 1H), 6.62 (dd, J=2.4, 2.0 Hz, 1H), 6.54 (s, 1H), 5.22 (s, 2H), 5.04-4.97 (m, 1H), 4.89 (s, 2H), 3.81 (br, s, 2H), 3.51 (br, s, 1H), 3.36 (br, s, 2H), 3.00-2.80 (m, 3H), 2.02 (br, s, 1H), 1.87 (br, s, 2H), 1.46 (d, 6H)

Preparation Example 6-1: Synthesis of (S)-1-[7-(3-chloro-1-isopropyl-1H-indazol-5-ylmethoxy)-2H-chromene-3-ylmethyl]-piperidin-3-carboxylic ethyl ester According to the method described in Preparation Example 1-4, 7-(3-chloro-1-isopropyl-1H-indazol-5-ylmethoxy)-2H-chromene-3-carbaldehyde (126 mg, 0.33 mmol) obtained from Preparation Example 1-3 and (S)-piperidin-3-carboxylic acid ethyl ester hydrochloride (77 mg, 0.49 mmol) were used to obtain the title compound (92 mg, 54%).

NMR: ¹H-NMR (400 HMz, CDCl$_3$); δ 7.70 (s, 1H), 7.47 (d, 1H), 7.41 (d, 1H), 6.86 (d, 1H), 6.50 (dd, J=2.4 Hz, 1H), 6.47 (s, 1H), 6.24 (s, 1H), 5.10 (s, 2H), 4.81-4.73 (m, 1H), 4.69 (s, 2H), 4.14-4.08 (m, 2H), 3.00 (q, 2H), 2.86 (d, 1H), 2.67 (d, 1H), 2.53 (br, s, 1H), 2.23 (br, s, 1H), 2.03 (br, s, 1H), 1.88 (br, s, 1H), 1.71 (br, s, 1H), 1.56 (d, 6H), 1.24 (t, 3H)

Example 6: Synthesis of (S)-1-[7-(3-chloro-1-H-isopropyl-1H-indazol-5-ylmethoxy)-2H-chromene-3-ylmethyl]-piperidin-3-carboxylic acid

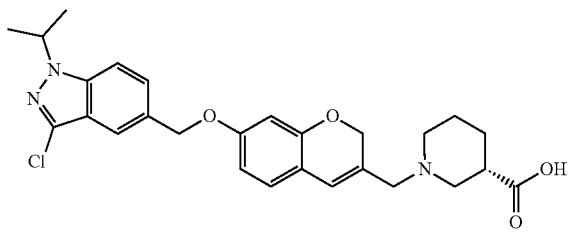 [SMILES: CC(C)n1nc(Cl)c2cc(COc3ccc4c(c3)OCC(CN3CCC[C@H](C(=O)O)C3)=C4)ccc21]

According to the method described in Example 1, (S)-1-[7-(3-chloro-1-isopropyl-1H-indazol-5-ylmethoxy)-2H-chromene-3-ylmethyl]-piperidin-3-carboxylic acid ethyl ester (92 mg, 0.20 mmol) obtained from Preparation Example 6-1 was used to obtain the title compound (78 mg, 89%).

NMR: ¹H-NMR (400 HMz, DMSO$_{d6}$); δ 7.80 (d, 1H), 7.72 (s, 1H), 7.54 (d, 1H), 7.08 (d, 1H), 6.70 (s, 1H), 6.62 (dd, J=2.4 Hz, 1H), 6.54 (d, J=2.4 Hz, 1H), 5.22 (s, 2H), 5.04-4.97 (m, 1H), 4.88 (s, 2H), 3.81 (br, s, 2H), 3.51 (br, s, 1H), 3.35 (br, s, 2H), 2.99-2.80 (m, 3H), 2.04 (br, s, 1H), 1.87 (br, s, 2H), 1.46 (d, 6H)

Preparation Example 7-1: Synthesis of (S)-1-[7-(3-chloro-1-isopropyl-1H-indazol-5-ylmethoxy)-2H-chromene-3-ylmethyl]-pyrrolidin-3-carboxylic acid methyl ester According to the method described in Preparation Example 1-4, 7-(3-chloro-1-isopropyl-1H-indazol-5-ylmethoxy)-2H-chromene-3-carbaldehyde (137 mg, 0.36 mmol) obtained from Preparation Example 1-3 and (S)-pyrrolidin-3-carboxylic acid methyl ester hydrochloride (90 mg, 0.54 mmol) were used to obtain the title compound (127 mg, 71%).

NMR: ¹H-NMR (400 HMz, CDCl$_3$); δ 7.69 (s, 1H), 7.46 (dd, J=1.2 Hz, 1H), 7.41 (d, 1H), 6.86 (d, 1H), 6.52-6.47 (m, 2H), 6.26 (s, 1H), 5.10 (s, 2H), 4.83-4.76 (m, 1H), 4.74 (s, 2H), 3.68 (s, 3H), 3.12 (q, 2H), 3.01 (q, 1H), 2.85 (t, 1H), 2.65-2.62 (m, 2H), 2.52 (q, 1H), 2.08-2.02 (m, 2H), 1.56 (d, 6H)

Example 7: Synthesis of (S)-1-[7-(3-chloro-1-H-isopropyl-1H-indazol-5-ylmethoxy)-2H-chromene-3-ylmethyl]-pyrrolidin-3-carboxylic acid

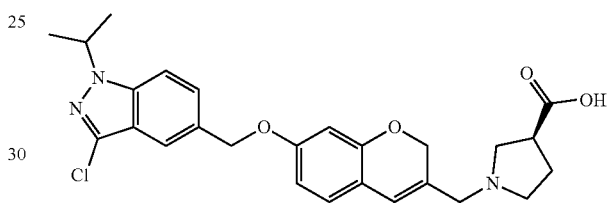

According to the method described in Example 1, (S)-1-[7-(3-chloro-1-isopropyl-1H-indazol-5-ylmethoxy)-2H-chromene-3-ylmethyl]-pyrrolidin-3-carboxylic acid methyl ester (127 mg, 0.26 mmol) obtained from Preparation Example 7-1 was used to obtain the title compound (97 mg, 79%).

NMR: ¹H-NMR (400 HMz, DMSO$_{d6}$); δ 7.80 (d, 1H), 7.72 (s, 1H), 7.54 (d, 1H), 7.06 (d, 1H), 6.71 (s, 1H), 6.61 (dd, J=2.0 Hz, 1H), 6.54 (s, 1H), 5.22 (s, 2H), 5.04-4.98 (m, 1H), 4.86 (s, 2H), 3.87 (s, 2H), 3.32 (br, s. 5H), 2.22 (d, 2H), 1.46 (d, 6H)

Preparation Example 8-1: Synthesis of 1-[7-(3-chloro-1-isopropyl-1H-indazol-5-ylmethoxy)-2H-chromene-3-ylmethyl]-3-chloromethyl-azetidin-3-carboxylic acid ethyl ester According to the method described in Preparation Example 1-4, 7-(3-chloro-1-isopropyl-1H-indazol-5-ylmethoxy)-2H-chromene-3-carbaldehyde (93 mg, 0.24 mmol) obtained from Preparation Example 1-3 and chloromethyl-azetidin-3-carboxylic acid ethyl ester hydrochloride (78 mg, 0.36 mmol) were used to obtain the title compound (53 mg, 41%).

NMR: ¹H-NMR (400 HMz, CDCl$_3$); δ 7.70 (s, 1H), 7.47 (dd, J=1.2 Hz, 1H), 7.42 (d, 1H), 6.87 (d, 1H), 6.51 (d, 1H), 6.51 (dd, J=2.4 Hz, 1H), 6.46 (d, 1H), 6.24 (s, 1H), 5.11 (s, 2H), 4.84-4.75 (m, 1H), 4.68 (s, 2H), 4.23 (q, 2H), 4.03 (s, 2H), 3.38 (d, 2H), 3.30 (d, 2H), 3.12 (s, 2H), 1.57 (d, 6H), 1.29 (t, 3H)

Example 8: Synthesis of 1-[7-(3-chloro-1-isopropyl-1H-indazol-5-ylmethoxy)-2H-chromene-3-ylmethyl]-chloromethyl-azetidin-3-carboxylic acid

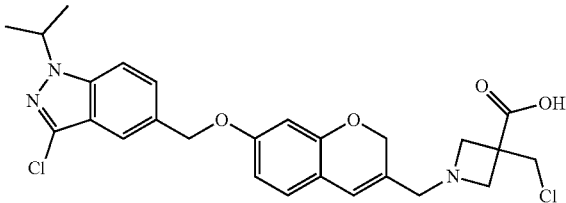 [SMILES: CC(C)n1nc(Cl)c2cc(COc3ccc4c(c3)OCC(CN3CC(CCl)(C(=O)O)C3)=C4)ccc21]

According to the method described in Example 1, 1-[7-(3-chloro-1-isopropyl-1H-indazol-5-ylmethoxy)-2H-chromene-3-ylmethyl]-3-chloromethyl-azetidin-3-carboxylic acid ethyl ester (53 mg, 0.10 mmol) obtained from Preparation Example 8-1 was used to obtain the title compound (42 mg, 83%).

NMR: $^1$H-NMR (400 HMz, DMSO$_{d6}$); δ 7.80 (d, 1H), 7.72 (s, 1H), 7.54 (d, 1H), 7.04 (d, 1H), 6.70 (s, 1H), 6.60 (d, 1H), 6.51 (s, 1H), 5.21 (s, 2H), 5.02-4.97 (m, 1H), 4.76 (s, 2H), 4.26 (br, s, 4H), 4.03 (d, 2H), 3.88 (s, 2H), 1.46 (d, 6H)

Preparation Example 9-1: Synthesis of (R)-1-[7-(3-chloro-1-isopropyl-1H-indazol-5-ylmethoxy)-2H-chromene-3-ylmethyl]-pyrrolidin-3-carboxylic acid methyl ester According to the method described in Preparation Example 1-4, 7-(3-chloro-1-isopropyl-1H-indazol-5-ylmethoxy)-2H-chromene-3-carbaldehyde (120 mg, 0.32 mmol) obtained from Preparation Example 1-3 and (R)-pyrrolidin-3-carboxylic acid methyl ester hydrochloride (177 mg, 1.07 mmol) were used to obtain the title compound (121 mg, 78%).

NMR: $^1$H-NMR (400 HMz, CDCl$_3$); δ 7.69 (s, 1H), 7.46 (dd, J=1.2 Hz, 1H), 7.41 (d, 1H), 6.86 (d, 1H), 6.52-6.47 (m, 2H), 6.26 (s, 1H), 5.10 (s, 2H), 4.83-4.76 (m, 1H), 4.74 (s, 2H), 3.68 (s, 3H), 3.12 (q, 2H), 3.01 (q, 1H), 2.85 (t, 1H), 2.65-2.62 (m, 2H), 2.52 (q, 1H), 2.08-2.02 (m, 2H), 1.56 (d, 6H)

Example 9: Synthesis of (R)-1-[7-(3-chloro-1-Isopropyl-1H-indazol-5-ylmethoxy)-2H-chromene-3-ylmethyl]-pyrrolidin-3-carboxylic acid

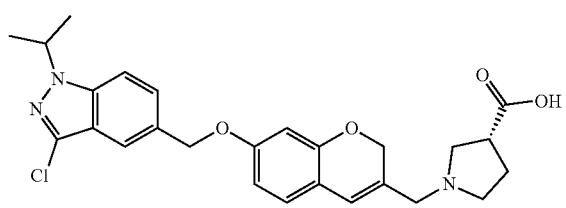 [SMILES: CC(C)n1nc(Cl)c2cc(COc3ccc4c(c3)OCC(CN3CC[C@@H](C(=O)O)C3)=C4)ccc21]

According to the method described in Example 1, (R)-1-[7-(3-chloro-1-isopropyl-1H-indazol-5-ylmethoxy)-2H-chromene-3-ylmethyl]-pyrrolidin-3-carboxylic acid methyl ester (121 mg, 0.24 mmol) obtained from Preparation Example 9-1 was used to obtain the title compound (101 mg, 86%).

NMR: $^1$H-NMR (400 HMz, DMSO$_{d6}$); δ 7.80 (d, 1H), 7.73 (s, 1H), 7.54 (d, 1H), 7.06 (d, 1H), 6.72 (s, 1H), 6.61 (dd, J=2.0 Hz, 1H), 6.53 (d, J=2.0 Hz, 1H), 5.22 (s, 2H), 5.04-4.97 (m, 1H), 4.87 (s, 2H), 3.87 (s, 2H), 3.31 (br, s, 3H), 2.51 (t, 2H), 2.22 (br, s, 1H), 2.16 (br, s, 1H), 1.46 (d, 6H)

Preparation Example 10-1: Synthesis of 7-hydroxy-4-methyl-2H-chromene-3-carbaldehyde The title compound was obtained according to the method described in International Patent Publication No. 2010-064707.

NMR: $^1$H-NMR (400 HMz, CDCl$_3$); δ 10.08 (s, 1H), 7.32 (d, 1H), 6.51 (dd, 1H), 6.38 (d, 1H), 4.88 (s, 2H), 2.45 (s, 3H)

Preparation Example 10-2: Synthesis of 7-(3-chloro-1-isopropyl-1H-indazol-5-ylmethoxy)-4-methyl-2H-chromene-3-carbaldehyde According to the method described in Preparation Example 1-3, (3-chloro-1-isopropyl-1H-indazol-5-yl)-methanol (193 mg, 0.86 mmol) obtained from Preparation Example 1-2 and 7-hydroxy-4-methyl-2H-chromene-3-carbaldehyde (136 mg, 0.72 mmol) obtained from Preparation Example 10-1 were used to obtain the title compound (104 mg, 30%).

NMR: $^1$H-NMR (400 HMz, CDCl$_3$); δ 10.10 (s, 1H), 7.71 (s, 1H), 7.46-7.41 (m, 3H), 7.38 (d, 1H), 6.67 (dd, 1H), 6.54 (d, 1H), 5.16 (s, 2H), 4.90 (s, 2H), 4.81-4.72 (m, 1H), 2.44 (s, 3H), 1.57 (d, 6H)

Preparation Example 10-3: Synthesis of 1-[7-(3-chloro-1-isopropyl-1H-indazol-5-ylmethoxy)-4-methyl-2H-chromene-3-ylmethyl]-piperidin-4-carboxylic acid ethyl ester According to the method described in Preparation Example 1-4, 7-(3-chloro-1-isopropyl-1H-indazol-5-ylmethoxy)-4-methyl-2H-chromene-3-carbaldehyde (104 mg, 0.26 mmol) obtained from Preparation Example 10-2 and piperidin-4-carboxylic acid ethyl ester hydrochloride (62 mg, 0.39 mmol) were used to obtain the title compound (101 mg, 72%).

NMR: $^1$H-NMR (400 HMz, CDCl$_3$); δ 7.70 (s, 1H), 7.46 (d, 1H), 7.41 (d, 1H), 7.10 (d, 1H), 6.57 (dd, J=2.4, 2.8 Hz, 1H), 6.50 (d, 1H), 5.12 (s, 2H), 4.83-4.74 (m, 1H), 4.65 (s, 2H), 0.81-4.72 (m, 1H), 4.12 (q, 2H), 3.07 (s, 2H), 2.83 (d, 2H), 2.28-2.22 (m, 1H), 1.99 (s, 3H), 1.98 (t, 2H), 1.85 (d, 2H), 1.75-1.66 (m, 2H), 1.57 (d, 6H), 1.25 (t, 3H)

Example 10: Synthesis of 1-[7-(3-chloro-1-Isopropyl-1H-indazol-5-ylmethoxy)-4-methyl-2H-chromene-3-ylmethyl]-piperidin-4-carboxylic acid

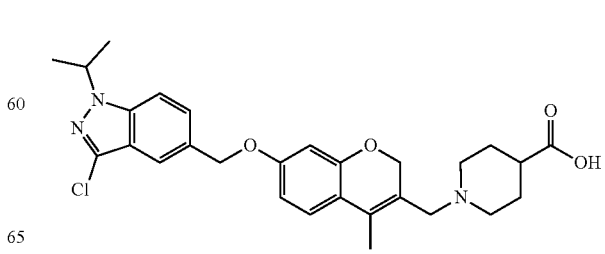

According to the method described in Example 1, 1-[7-(3-chloro-1-isopropyl-1H-indazol-5-ylmethoxy)-4-methyl-2H-chromene-3-ylmethyl]-piperidin-4-carboxylic acid ethyl ester (101 mg, 0.19 mmol) obtained from Preparation Example 10-3 was used to obtain the title compound (34 mg, 35%).

NMR: $^1$H-NMR (400 HMz, DMSO$_{d6}$); δ 7.79 (d, 1H), 7.72 (s, 1H), 7.54 (d, 1H), 7.19 (br, s, 1H), 6.63 (d, 1H), 6.51 (s, 1H), 5.21 (s, 2H), 5.02-4.98 (m, 1H), 4.60 (br, s, 2H), 3.33 (br, s, 4H), 3.17 (br, s, 2H), 2.80 (br, s, 2H), 2.22 (br, s, 1H), 1.98 (s, 3H), 1.83 (br, s, 2H), 1.46 (d, 6H)

Preparation Example 11-1: Synthesis of 4-chloro-7-hydroxy-2H-chromene-3-carbaldehyde The title compound was obtained according to the method described in International Patent Publication No. 2010-064707.

NMR: $^1$H-NMR (400 HMz, CDCl$_3$); δ 10.09 (s, 1H), 7.57 (d, 1H), 6.54 (dd, 1H), 6.38 (d, 1H), 4.99 (s, 2H), 1.46 (s, 9H)

Preparation Example 11-2: Synthesis of 4-chloro-7-(3-chloro-1-isopropyl-1H-indazol-5-ylmethoxy)-2H-chromene-3-carbaldehyde According to the method described in Preparation Example 1-3, (3-chloro-1-isopropyl-1H-indazol-5-yl)-methanol (87 mg, 0.39 mmol) obtained from Preparation Example 1-2 and 4-chloro-7-hydroxy-2H-chromene-3-carbaldehyde (60 mg, 0.29 mmol) obtained from Preparation Example 11-1 were used to obtain the title compound (18 mg, 15%).

NMR: $^1$H-NMR (400 HMz, CDCl$_3$); δ 10.11 (s, 1H), 7.71 (s, 1H), 7.63 (d, 1H), 7.46 (d, 1H), 6.71 (dd, 1H), 6.54 (d, 1H), 5.18 (s, 2H), 5.01 (s, 2H), 4.85-4.77 (m, 1H), 1.58 (d, 6H)

Preparation Example 11-3: Synthesis of 1-[4-chloro-7-(3-chloro-1-isopropyl-1H-indazol-5-ylmethoxy)-2H-chromene-3-ylmethyl]-piperidin-4-carboxylic acid ethyl ester According to the method described in Preparation Example 1-4, 4-chloro-7-(3-chloro-1-isopropyl-1H-indazol-5-ylmethoxy)-2H-chromene-3-carbaldehyde (18 mg, 0.04 mmol) obtained from Preparation Example 11-2 and piperidin-4-carboxylic acid ethyl ester hydrochloride (10 mg, 0.07 mmol) were used to obtain the title compound (12 mg, 50%).

NMR: $^1$H-NMR (500 HMz, CDCl$_3$); δ 7.70 (s, 1H), 7.47 (d, 1H), 7.42 (d, 1H), 7.36 (d, 1H), 6.59 (dd, J=2.45 Hz, 1H), 6.49 (d, 1H), 5.12 (s, 2H), 4.91-4.76 (m, 3H), 4.12 (q, 2H), 3.25 (s, 2H), 2.82 (d, 2H), 2.27-2.24 (m, 1H), 2.06 (t, 1H), 1.86 (d, 2H), 1.73-1.67 (m, 2H), 1.57 (d, 6H), 1.24 (t, 3H)

Example 11: Synthesis of 1-[4-chloro-7-(3-chloro-1-H-isopropyl-1H-indazol-5-ylmethoxy)-2H-chromene-3-ylmethyl]-piperidin-4-carboxylic acid According to the method described in Example 1, 1-[4-chloro-7-(3-chloro-1-isopropyl-1H-indazol-5-ylmethoxy)-2H-chromene-3-ylmethyl]-piperidin-4-carboxylic acid ethyl ester (12 mg, 0.02 mmol) obtained from Preparation Example 11-3 was used to obtain the title compound (10 mg, 86%).

NMR: $^1$H-NMR (500 HMz, DMSO$_{d6}$); δ 7.77 (d, 1H), 7.70 (s, 1H), 7.51 (d, 1H), 7.36 (d, 1H), 6.72 (d, 1H), 6.62 (s, 1H), 5.23 (s, 2H), 4.98-4.91 (m, 3H), 3.30 (br, s, 4H), 3.03 (br, s, 1H), 2.46 (br, s, 3H), 1.99 (br, s, 2H), 1.80 (br, s, 1H), 1.42 (d, 6H)

Preparation Example 12-1: Synthesis of 5-fluoro-7-hydroxy-2H-chromene-3-carbaldehyde The title compound was obtained according to the method described in International Patent Publication No. 2010-064707.

NMR: $^1$H-NMR (400 HMz, CDCl$_3$); δ 9.54 (s, 1H), 7.44 (s, 1H), 6.22 (dd, 1H), 6.18 (d, 1H), 5.59 (s, 1H), 5.01 (d, 2H)

Preparation Example 12-2: Synthesis of 3-chloro-1-isopropyl-1H-indazol-5-ylmethoxy)-5-fluoro-2H-chromene-3-carbaldehyde According to the method described in Preparation Example 1-3, (3-chloro-1-isopropyl-1H-indazol-5-yl)-methanol (80 mg, 0.35 mmol) obtained from Preparation Example 1-2 and 5-fluoro-7-hydroxy-2H-chromene-3-carbaldehyde (57 mg, 0.30 mmol) obtained from Preparation Example 12-1 were used to obtain the title compound (19 mg, 14%).

NMR: $^1$H-NMR (500 HMz, CDCl$_3$); δ 9.53 (s, 1H), 7.69 (s, 1H), 7.44 (s, 1H), 7.43 (d, 1H), 6.35 (d, 1H), 6.32 (s, 1H), 5.16 (s, 2H), 5.01 (s, 2H), 4.82-4.76 (m, 1H), 1.58 (d, 6H)

Preparation Example 12-3: Synthesis of 1-[7-(3-chloro-1-isopropyl-1H-indazol-5-ylmethoxy)-5-fluoro-2H-chromene-3-ylmethyl]-piperidin-4-carboxylic acid ethyl ester According to the method described in Preparation Example 1-4, 7-(3-chloro-1-isopropyl-1H-indazol-5-ylmethoxy)-5-fluoro-2H-chromene-3-carbaldehyde (19 mg, 0.05 mmol) obtained from Preparation Example 12-2 and piperidin-4-carboxylic acid ethyl ester hydrochloride (11 mg, 0.07 mmol) were used to obtain the title compound (15 mg, 58%).

NMR: $^1$H-NMR (500 HMz, CDCl$_3$); δ 7.68 (s, 1H), 7.46-7.41 (m, 2H), 6.42 (s, 1H), 6.27-6.25 (m, 2H), 5.08 (s, 2H), 4.80-4.76 (m, 1H), 4.72 (s, 2H), 4.12 (q, 2H), 3.01 (s, 2H), 2.83 (d, 2H), 2.26-2.23 (m, 1H), 1.96 (t, 2H), 1.86 (d, 2H), 1.72 (t, 2H), 1.57 (d, 6H), 1.24 (t, 3H)

Example 12: Synthesis of 1-[7-(3-chloro-1-H-isopropyl-1H-indazol-5-ylmethoxy)-5-fluoro-2H-chromene-3-ylmethyl]-piperidin-4-carboxyl acid

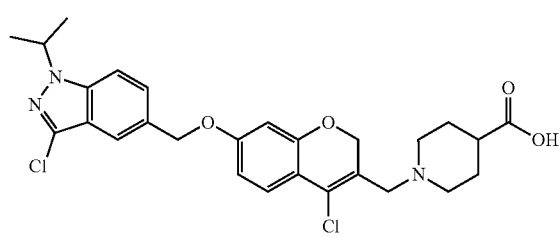 [SMILES: CC(C)n1nc(Cl)c2cc(COc3ccc4c(c3)OCC(CN3CCC(C(=O)O)CC3)=C4Cl)ccc21]

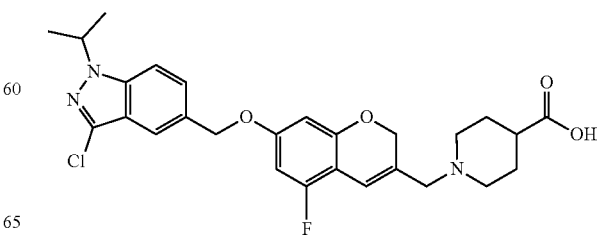

According to the method described in Example 1, 1-[7-(3-chloro-1-isopropyl-1H-indazol-5-ylmethoxy)-5-fluoro-2H-chromene-3-ylmethyl]-piperidin-4-carboxylic ethyl ester (15 mg, 0.03 mmol) obtained from Preparation Example 12-3 was used to obtain the title compound (12 mg, 81%).

NMR: $^1$H-NMR (500 HMz, DMSO$_{d6}$); δ 7.76 (d, 1H), 7.69 (s, 1H), 7.49 (d, 1H), 6.78 (br, s, 1H), 6.53 (d, 1H), 6.39 (s, 1H), 5.18 (s, 2H), 4.98-4.94 (m, 1H), 4.81 (br, s, 2H), 3.31 (br, s, 4H), 2.86 (br, s, 1H), 2.46 (br, s, 3H), 1.95 (br, s, 2H), 1.79 (br, s, 1H), 1.42 (d, 6H)

Preparation Example 13-1: Synthesis of 5-bromo-3-trifluoromethyl-1H-indazole

The title compound was obtained according to the method described in International Patent Publication No. 2008-086404.

NMR: $^1$H-NMR (400 HMz, CDCl$_3$); δ 10.9 (s, 1H), 8.02 (s, 1H), 7.58 (dd, 1H), 7.46 (d, 1H)

Preparation Example 13-2: Synthesis of 5-bromo-1-isopropyl-3-trifluoromethyl-1H-indazole According to the method described in Preparation Example 3-2, 5-bromo-3-trifluoromethyl-1H-indazole (540 mg, 2.04 mmol) obtained from Preparation Example 13-1 and isopropyl iodide (0.41 me, 4.08 mmol) were used to obtain the title compound (310 mg, 50%).

NMR: $^1$H-NMR (400 HMz, CDCl$_3$); δ 7.98 (s, 1H), 7.52 (dd, 1H), 7.39 (d, 1H), 4.86 (m, 1H), 1.62 (d, 6H)

Preparation Example 13-3: Synthesis of 1-isopropyl-3-trifluoromethyl-1H-indazol-5-carbonitrile 5-Bromo-1-isopropyl-3-trifluoromethyl-1H-indazole (310 Mg, 1.01 mmol) obtained from Preparation Example 13-2 was dissolved in N-methylpyrrolidone, and then zinc cyanide (ZnCN$_2$, 1.9 g, 14.16 mmol) and palladium tetrakis triphenylphosphine ([Pd(Ph$_3$P)$_4$], 1.0 g, 0.71 mmol) were added dropwise thereto. The mixture was stirred for 4 hours at 100° C., added with water, and extracted with ethyl acetate. The extract was washed with brine, dried with anhydrous magnesium sulfate and filtered. The filtrate was distilled under reduced pressure. The residue was separated by column chromatography to obtain the title compound (100 mg, 39%).

NMR: $^1$H-NMR (400 HMz, CDCl$_3$); δ 8.23 (s, 1H), 7.62 (m, 2H), 4.89 (m, 1H), 1.64 (d, 6H)

Preparation Example 13-4: Synthesis of 1-isopropyl-3-trifluoromethyl-1H-indazol-5-carboxylic acid 1-isopropyl-3-trifluoromethyl-1H-indazol-5-carbonitrile (100 mg, 0.39 mmol) obtained from Preparation Example 13-3 was dissolved in ethanol (100 mL), and then 6 N sodium hydroxide aqueous solution (6.7 mL, 40.20 mmol) was added dropwise thereto. The mixture was stirred under reflux for 18 hours and the solvent was removed by distillation under reduced pressure. The residue was added with 1 N hydrochloric acid aqueous solution and extracted with ethyl acetate. The extract was washed with brine, dried with anhydrous magnesium sulfate and filtered. The filtrate was distilled under reduced pressure to obtain the title compound (69 mg, 65%).

Preparation Example 13-5: Synthesis of 1-isopropyl-3-trifluoromethyl-1H-indazol-5-carboxylic acid methyl ester 1-isopropyl-3-trifluoromethyl-1H-indazol-5-carboxylic acid (69 Mg, 0.25 mmol) obtained from Preparation Example 13-4 was dissolved in tetrahydrofuran (10 mL), and then 0.25 M diazomethane diethyl ether (1.2 mL, 0.3 mmol) was slowly added dropwise thereto. The mixtures was stirred at room temperature for 30 minutes and distilled under reduced pressure to obtain the title compound (53 mg, 75%).

NMR: $^1$H-NMR (400 HMz, CDCl$_3$); δ 8.58 (s, 1H), 8.11 (dd, 1H), 7.52 (d, 1H), 4.91 (m, 1H), 3.96 (s, 3H), 1.62 (d, 6H)

Preparation Example 13-6: Synthesis of (1-isopropyl-3-trifluoromethyl-1H-indazol-5-yl)-methanol According to the method described in Preparation Example 3-4, 1-isopropyl-3-trifluoromethyl-1H-indazol-5-carboxylic acid methyl ester (53 mg, 0.19 mmol) obtained from Preparation Example 13-5 was used to obtain the title compound (30 mg, 61%).

Preparation Example 13-7: Synthesis of 7-(1-isopropyl-3-trifluoromethyl-1H-indazol-5-ylmethoxy)-2H-chromene-3-carbaldehyde According to the method described in Preparation Example 1-3, (1-isopropyl-3-trifluoromethyl-1H-indazol-5-yl)-methanol (30 mg, 0.12 mmol) obtained from Preparation Example 13-6 and 7-hydroxy-2H-chromene-3-carbaldehyde (25 mg, 0.14 mmol) obtained from Preparation Example 1-1 were used to obtain the title compound (23 mg, 48%).

NMR: $^1$H-NMR (400 HMz, CDCl$_3$); 9.53 (s, 1H), 7.87 (s, 1H), 7.52 (m, 2H), 7.22 (s, 1H), 7.14 (d, 1H), 6.62 (dd, 1H), 6.51 (d, 1H), 5.17 (s, 2H), 5.03 (s, 2H), 4.90 (m, 1H), 1.62 (d, 6H)

Preparation Example 13-8: Synthesis of 1-[7-(1-isopropyl-3-trifluoromethyl-1H-indazol-5-ylmethoxy)-2H-chromene-3-ylmethyl]-piperidin-4-carboxylic acid ethyl ester According to the method described in Preparation Example 1-4, 7-(1-isopropyl-3-trifluoromethyl-1H-indazol-5-ylmethoxy)-2H-chromene-3-carbaldehyde (23 mg, 0.06 mmol) obtained from Preparation Example 13-7 and piperidin-4-carboxylic acid ethyl ester hydrochloride (12 mg, 0.08 mmol) were used to obtain the title compound (21 mg, 68%).

NMR: $^1$H-NMR (500 HMz, CDCl$_3$); δ7.85 (s, 1H), 7.52 (s, 2H), 6.86 (d, 1H), 6.49 (m, 2H), 6.24 (s, 1H), 5.12 (s, 2H), 4.90 (m, 1H), 4.73 (s, 2H), 4.13 (q, 2H), 2.99 (s, 2H), 2.84 (m, 2H), 2.26 (m, 1H), 1.85 (m, 6H), 1.62 (d, 6H), 1.25 (t, 3H)

Example 13: Synthesis of 1-[7-(1-Isopropyl-3-trifluoromethyl-1H-indazol-5-ylmethoxy)-2H-chromene-3-ylmethyl]-piperidin-4-carboxylic acid

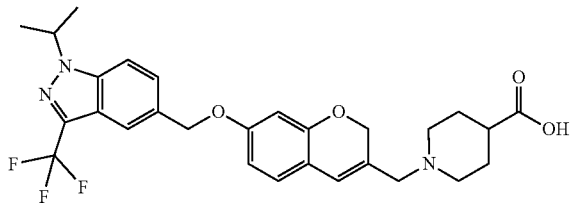 [SMILES: CC(C)n1nc(C(F)(F)F)c2cc(COc3ccc4c(c3)OCC(CN3CCC(C(=O)O)CC3)=C4)ccc21]

According to the method described in Example 1, 1-[7-(1-isopropyl-3-trifluoromethyl-1H-indazol-5-ylmethoxy)-2H-chromene-3-ylmethyl]-piperidin-4-carboxylic acid ethyl ester (21 mg, 0.04 mmol) obtained from Preparation Example 13-8 was used to obtain the title compound (3 mg, 15%).

NMR: $^1$H-NMR (500 HMz, DMSO$_{d6}$); δ 7.89 (s, 1H), 7.55 (s, 2H), 6.92 (d, 1H), 6.54 (m, 2H), 6.36 (s, 1H), 5.16 (s, 2H), 4.92 (m, 1H), 4.80 (s, 2H), 3.23 (s, 2H), 3.09 (m, 4H), 2.37 (m, 1H), 1.89 (m, 4H), 1.65 (d, 6H)

Preparation Example 14-1: Synthesis of 5-bromo-3-ethyl-1H-indazole

The title compound was obtained according to the method described in International Patent Publication No. 2005-085227.

NMR: $^1$H-NMR (400 HMz, CDCl$_3$); δ 10.20 (s, 1H), 7.83 (d, 1H), 7.48 (dd, 1H), 7.32 (d, 1H), 2.57 (s, 3H)

Preparation Example 14-2: Synthesis of 5-bromo-1-isopropyl-3-ethyl-1H-indazole

According to the method described in Preparation Example 3-2, 5-bromo-3-ethyl-1H-indazole (740 mg, 3.29 mmol) obtained from Preparation Example 14-1 and isopropyl iodide (0.65 mL, 6.58 mmol) were used to obtain the title compound (680 mg, 77%).

NMR: $^1$H-NMR (400 HMz, CDCl$_3$); δ 7.81 (s, 1H), 7.40 (dd, 1H), 7.26 (d, 1H), 4.73 (m, 1H), 2.96 (q, 2H), 1.35 (t, 3H)

Preparation Example 14-3: Synthesis of 1-isopropyl-3-ethyl-1H-indazol-5-carbonitrile According to the method described in Preparation Example 13-3, 5-bromo-1-isopropyl-3-ethyl-1H-indazole (680 mg, 2.55 mmol) obtained from Preparation Example 14-2 was used to obtain the title compound (190 mg, 35%).

Preparation Example 14-4: Synthesis of 1-isopropyl-3-ethyl-1H-indazol-5-carboxylic acid According to the method described in Preparation Example 13-4, 1-isopropyl-3-ethyl-1H-indazol-5-carbonitrile (190 mg, 0.89 mmol) obtained from Preparation Example 14-3 was used to obtain the title compound (85 mg, 41%).

Preparation Example 14-5: Synthesis of 1-isopropyl-3-ethyl-1H-indazol-5-carboxylic acid methyl ester 1-isopropyl-3-ethyl-1H-indazol-5-carboxylic acid (85 mg, 0.36 mmol) obtained from Preparation Example 14-4 was dissolved in tetrahydrofuran (10 mL), and then 0.25 M diazomethane diethyl ether (1.73 mL, 0.43 mmol) was slowly added dropwise thereto. The mixtures was stirred at room temperature for 30 minutes and distilled under reduced pressure to obtain the title compound (69 mg, 78%).

Preparation Example 14-6: Synthesis of (1-isopropyl-3-ethyl-1H-indazol-5-yl)-methanol According to the method described in Preparation Example 3-4, 1-isopropyl-3-ethyl-1H-indazol-5-carboxylic acid methyl ester (69 mg, 0.28 mmol) obtained from Preparation Example 14-5 was used to obtain the title compound (40 mg, 65%).

Preparation Example 14-7: Synthesis of 7-(1-isopropyl-3-ethyl-1H-indazol-5-ylmethoxy)-2H-chromene-3-carbaldehyde According to the method described in Preparation Example 1-3, (1-isopropyl-3-ethyl-1H-indazol-5-yl)-methanol (40 mg, 0.18 mmol) obtained from Preparation Example 14-6 and 7-hydroxy-2H-chromene-3-carbaldehyde (38 mg, 0.22 mmol) obtained from Preparation Example 1-1 were used to obtain the title compound (29 mg, 43%).

Preparation Example 14-8: Synthesis of 1-[7-(1-isopropyl-3-ethyl-1H-indazol-5-ylmethoxy)-2H-chromene-3-ylmethyl]-piperidin-4-carboxylic acid ethyl ester According to the method described in Preparation Example 1-4, 7-(1-isopropyl-3-ethyl-1H-indazol-5-ylmethoxy)-2H-chromene-3-carbaldehyde (29 mg, 0.08 mmol) obtained from Preparation Example 14-7 and piperidin-4-carboxylic acid ethyl ester hydrochloride (19 mg, 0.12 mmol) were used to obtain the title compound (20 mg, 48%).

NMR: $^1$H-NMR (500 HMz, CDCl$_3$); δ 7.70 (s, 1H), 7.38 (s, 2H), 6.85 (d, 1H), 6.48 (m, 2H), 6.23 (s, 1H), 5.08 (s, 2H), 4.78 (m, 1H), 4.72 (s, 2H), 4.12 (q, 2H), 2.99 (m, 4H), 2.82 (m, 2H), 2.25 (m, 1H), 1.83 (m, 6H), 1.55 (d, 6H), 1.37 (t, 3H), 1.25 (t, 3H)

Example 14: Synthesis of 1-[7-(1-H-isopropyl-3-ethyl-1H-indazol-5-ylmethoxy)-2H-chromene-3-ylmethyl]-piperidin-4-carboxylic acid

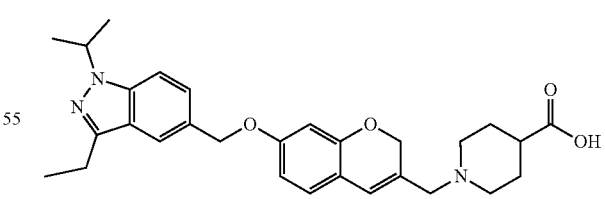

According to the method described in Example 1, 1-[7-(1-isopropyl-3-ethyl-1H-indazol-5-ylmethoxy)-2H-chromene-3-ylmethyl]-piperidin-4-carboxylic acid ethyl ester (20 mg, 0.04 mmol) obtained from Preparation Example 14-8 was used to obtain the title compound (10 mg, 51%).

NMR: $^1$H-NMR (500 HMz, DMSO$_{d6}$); δ 7.69 (s, 1H), 7.37 (s, 2H), 6.86 (d, 1H), 6.49 (m, 2H), 6.29 (s, 1H), 5.06

(s, 2H), 4.76 (m, 3H), 3.16 (s, 2H), 3.05 (m, 3H), 2.27 (m, 1H), 2.03 (m, 6H), 1.54 (d, 6H), 1.36 (t, 3H)

Preparation Example 15-1: Synthesis of azepane-4-carboxylic acid ethyl ester, hydrochloride The title compound was obtained according to the method described in US Patent Publication No. 2007-0225275.

NMR: $^1$H-NMR (500 HMz, CDCl$_3$); δ 9.55 (br, s, 2H), 4.09 (m, 2H), 3.41-2.95 (m, 4H), 2.68 (br, s, 1H), 2.41-1.73 (m, 6H), 1.22-1.10 (m, 3H)

Preparation Example 15-2: Synthesis of 1-[7-(3-chloro-1-isopropyl-1H-indazol-5-ylmethoxy)-2H-chromene-3-ylmethyl]-azepane-4-carboxylic acid ethyl ester According to the method described in Preparation Example 1-4, 7-(3-chloro-1-isopropyl-1H-indazol-5-yl-methoxy)-2H-chromene-3-carbaldehyde (204 mg, 0.53 mmol) obtained from Preparation Example 1-3 and azepane-4-carboxylic acid ethyl ester, hydrochloride (166 mg, 0.80 mmol) were used to obtain the title compound (229 mg, 79%).

NMR: $^1$H-NMR (500 HMz, CDCl$_3$); δ 7.69 (s, 1H), 7.48-7.44 (m, 1H), 7.41-7.39 (m, 1H), 6.88-6.84 (m, 1H), 6.51-6.45 (m, 2H), 6.21 (s, 1H), 5.10 (s, 2H), 4.78-4.73 (m, 1H), 4.73 (s, 2H), 4.14-4.08 (m, 2H), 3.10 (s, 2H), 2.70-2.63 (m, 1H), 2.62-2.50 (m, 4H), 1.99-1.88 (m, 2H), 1.87-1.71 (m, 3H), 1.62-1.51 (m, 7H), 1.27-1.20 (m, 3H)

Example 15: Synthesis of 1-[7-(3-chloro-1-isopropyl-1H-indazol-5-ylmethoxy)-2H-chromene-3-ylmethyl]-azepane-4-carboxylic acid

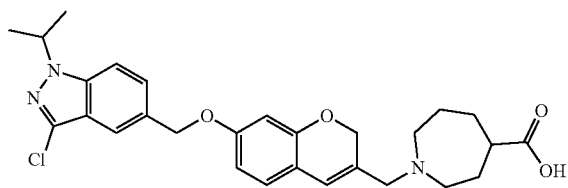 [SMILES: CC(C)n1nc(Cl)c2cc(COc3ccc4c(c3)OCC(CN3CCCC(C(=O)O)CC3)=C4)ccc21]

According to the method described in Example 1, 1-[7-(3-chloro-1-isopropyl-1H-indazol-5-ylmethoxy)-2H-chromene-3-ylmethyl]-azepane-4-carboxylic acid ethyl ester (229 mg, 0.43 mmol) obtained from Preparation Example 15-2 was used to obtain the title compound (170 mg, 78%).

NMR: $^1$H-NMR (500 HMz, DMSO$_{d6}$); δ 7.75 (d, 1H), 7.68 (s, 1H), 7.49 (d, 1H), 7.01 (d, 1H), 6.67 (s, 1H), 6.56 (d, 1H), 6.49 (s, 1H), 5.18 (s, 2H), 5.02-4.92 (m, 1H), 4.82 (s, 2H), 3.76 (s, 2H), 3.33-2.88 (m, 4H), 2.59 (br, s, 1H), 2.19-1.73 (m, 6H), 1.49-1.35 (m, 7H)

Preparation Example 16-1: Synthesis of 3-chloro-1-propyl-1H-indazol-5-carboxylic acid methyl ester According to the method described in Preparation Example 3-3, 1-propyl-1H-indazol-5-carboxylic acid methyl ester (598 mg, 2.74 mmol) obtained from Preparation Example 3-2 was used to obtain the title compound (643 mg, 93%).

NMR: $^1$H-NMR (500 HMz, CDCl$_3$); δ 8.31 (s, 1H), 7.99-7.95 (dd, 1H), 7.29 (d, 1H), 4.20 (t, 2H), 3.86 (s, 3H), 1.89-1.83 (m, 2H), 0.84 (t, 3H)

Preparation Example 16-2: Synthesis of (3-chloro-1-propyl-1H-indazol-5-yl)-methanol According to the method described in Preparation Example 3-4, 3-chloro-1-propyl-1H-indazol-5-carboxylic acid methyl ester (256 mg, 1.01 mmol) obtained from Preparation Example 16-1 was used to obtain the title compound (212 mg, 93%).

NMR: $^1$H-NMR (500 HMz, CDCl$_3$); δ 7.58 (s, 1H), 7.41-7.38 (dd, 1H), 7.31 (d, 1H), 4.74 (s, 2H), 4.22 (t, 2H), 2.61 (br, s, 1H), 1.92-1.84 (m, 2H), 0.87 (t, 3H)

Preparation Example 16-3: Synthesis of 7-(3-chloro-1-propyl-1H-indazol-5-ylmethoxy)-2H-chromene-3-carbaldehyde According to the method described in Preparation Example 3-5, (3-chloro-1-propyl-1H-indazol-5-yl)-methanol (97 mg, 0.43 mmol) obtained from Preparation Example 16-2 and 7-hydroxy-2H-chromene-3-carbaldehyde (76 mg, 0.43 mmol) obtained from Preparation Example 1-1 were used to obtain the title compound (63 mg, 38%).

NMR: $^1$H-NMR (500 HMz, CDCl$_3$); δ 9.52 (s, 1H), 7.71 (s, 1H), 7.48-7.36 (m, 3H), 7.15-7.12 (m, 1H), 6.62-6.60 (m, 1H), 6.50 (m, 1H), 5.15 (s, 2H), 5.02 (s, 2H), 4.30-4.24 (m, 2H), 1.98-1.89 (m, 2H), 0.94-0.86 (m, 3H)

Preparation Example 16-4: Synthesis of 1-[7-(3-chloro-1-propyl-1H-indazol-5-ylmethoxy)-2H-chromene-3-ylmethyl]-azetidin-3-carboxylic acid methyl ester According to the method described in Preparation Example 1-4, 7-(3-chloro-1-propyl-1H-indazol-5-yl-methoxy)-2H-chromene-3-carbaldehyde (65 mg, 0.17 mmol) obtained from Preparation Example 16-3 and azetidin-3-carboxylic acid methyl ester hydrochloride (51 mg, 0.34 mmol) were used to obtain the title compound (50 mg, 62%).

NMR: $^1$H-NMR (500 HMz, CDCl$_3$); δ 7.69 (s, 1H), 7.46 (d, 1H), 7.37 (d, 1H), 6.86 (d, 1H), 6.50 (d, 1H), 6.45 (d, 1H), 6.23 (s, 1H), 5.09 (s, 2H), 4.68 (s, 2H), 4.26 (t, 2H), 3.70 (s, 3H), 3.51 (t, 2H), 3.28 (m, 3H), 3.09 (s, 2H), 1.92 (m, 2H), 0.90 (t, 3H)

Example 16: Synthesis of 1-[7-(3-chloro-1-propyl-1H-indazol-5-ylmethoxy)-2H-chromene-3-ylmethyl]-azetidin-3-carboxylic acid

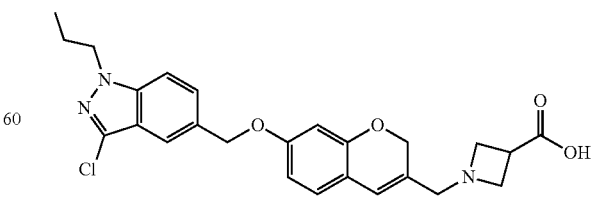

According to the method described in Example 1, 1-[7-(3-chloro-1-propyl-1H-indazol-5-ylmethoxy)-2H-chromene-3-ylmethyl]-azetidin-3-carboxylic acid methyl ester (50 mg, 0.16 mmol) obtained from Preparation Example 16-4 was used to obtain the title compound (15 mg, 19%).

NMR: $^1$H-NMR (500 MHz, CDCl$_3$); δ 7.69 (s, 1H), 7.46 (d, 1H), 7.37 (d, 1H), 6.86 (d, 1H), 6.50 (d, 1H), 6.45 (d, 1H), 6.23 (s, 1H), 5.09 (s, 2H), 4.68 (s, 2H), 4.26 (t, 2H), 3.70 (s, 3H), 3.51 (t, 2H), 3.27 (m, 1H), 3.09 (s, 2H), 1.92 (m, 2H)

Preparation Example 17-1: Synthesis of 1-[7-(3-chloro-1-propyl-1H-indazol-5-ylmethoxy)-2H-chromene-3-ylmethyl]-piperidin-4-carboxylic acid ethyl ester According to the method described in Preparation Example 1-4, 7-(3-chloro-1-propyl-1H-indazol-5-ylmethoxy)-2H-chromene-3-carbaldehyde (63 mg, 0.17 mmol) obtained from Preparation Example 16-3 and piperidin-4-carboxylic acid ethyl ester hydrochloride (39 mg, 0.25 mmol) were used to obtain the title compound (22 mg, 25%).

NMR: $^1$H-NMR (500 HMz, CDCl$_3$); δ 7.69 (s, 1H), 7.46 (d, 1H), 7.37 (m, 1H), 6.85 (d, 1H), 6.53-6.45 (m, 2H), 6.23 (s, 1H), 5.10 (s, 2H), 4.72 (s, 2H), 4.27 (t, 2H), 4.14-4.09 (m, 2H), 2.98 (s, 2H), 2.83 (d, 2H), 2.25 (m, 1H), 2.01-1.87 (m, 6H), 1.71-1.68 (m, 2H), 1.24 (t, 3H), 0.91 (t, 3H)

Example 17: Synthesis of 1-[7-(3-chloro-1-propyl-1H-Indazol-5-ylmethoxy)-2H-chromene-3-ylmethyl]-piperidin-4-carboxylic acid

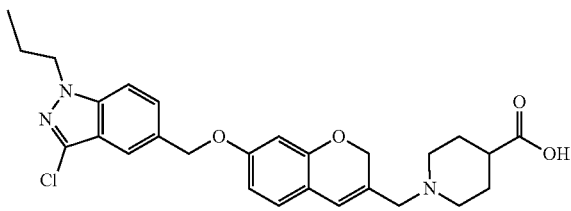 [SMILES: CCCn1nc(Cl)c2cc(COc3ccc4c(c3)OCC(CN3CCC(C(=O)O)CC3)=C4)ccc21]

According to the method described in Example 1, 1-[7-(3-chloro-1-propyl-1H-indazol-5-ylmethoxy)-2H-chromene-3-ylmethyl]-piperidin-4-carboxylic acid ethyl ester (22 mg, 0.04 mmol) obtained from Preparation Example 17-1 was used to obtain the title compound (16 mg, 80%).

NMR: $^1$H-NMR (500 MHz, DMSO$_{d6}$); δ 7.75 (d, 1H), 7.69 (s, 1H), 7.50 (dd, 1H), 7.04 (m, 1H), 6.68-6.54 (m, 2H), 6.50 (s, 1H), 5.20 (s, 2H), 4.72 (s, 2H), 4.33-4.22 (m, 4H), 2.15-1.91 (m, 2H), 1.87-1.65 (m, 6H), 1.46-1.04 (m, 4H), 0.80-0.71 (m, 3H)

Preparation Example 18-1: Synthesis of 1-cyclopropylmethyl-1H-indazol-5-carboxylic acid methyl ester According to the method described in Preparation Example 3-2, 1H-indazol-5-carboxylic acid methyl ester (200 mg, 1.13 mmol) obtained from Preparation Example 3-1 and cyclopropylmethyl bromide (0.12 me, 1.25 mmol) were used to obtain 1-cyclopropylmethyl-1H-indazol-5-carboxylic acid methyl ester (116 mg, 55%).

Preparation Example 18-2: Synthesis of 3-chloro-1-cyclopropylmethyl-1H-indazol-5-carboxylic acid methyl ester According to the method described in Preparation Example 3-3, 1-cyclopropylmethyl-1H-indazol-5-carboxylic acid methyl ester (116 mg, 0.55 mmol) obtained from Preparation Example 18-1 was used to obtain the title compound (128 mg, 93%).

NMR: $^1$H-NMR (500 HMz, CDCl$_3$); δ 8.42 (s, 1H), 8.06 (dd, 1H), 7.38 (d, 1H), 4.19 (d, 2H), 3.94 (s, 3H), 1.32 (m, 1H), 0.59 (m, 2H), 0.40 (m, 2H)

Preparation Example 18-3: Synthesis of (3-chloro-1-cyclopropylmethyl-1H-indazol-5-yl)-methanol According to the method described in Preparation Example 3-4, 3-chloro-1-cyclopropylmethyl-1H-indazol-5-carboxylic acid methyl ester (128 mg, 0.51 mmol) obtained from Preparation Example 18-2 was used to obtain the title compound (106 mg, 93%).

Preparation Example 18-4: Synthesis of 7-(3-chloro-1-cyclopropylmethyl-1H-indazol-5-ylmethoxy)-2H-chromene-3-carbaldehyde According to the method described in Preparation Example 3-5, (3-chloro-1-cyclopropylmethyl-1H-indazol-5-yl)-methanol (48 mg, 0.22 mmol) obtained from Preparation Example 18-3 and 7-hydroxy-2H-chromene-3-carbaldehyde (38 mg, 0.22 mmol) obtained from Preparation Example 1-1 were used to obtain the title compound (31 mg, 38%).

Preparation Example 18-5: Synthesis of 1-[7-(3-chloro-1-cyclopropylmethyl-1H-indazol-5-ylmethoxy)-2H-chromene-3-ylmethyl]-piperidin-4-carboxylic acid ethyl ester According to the method described in Preparation Example 1-4, 7-(3-chloro-1-cyclopropylmethyl-1H-indazol-5-ylmethoxy)-2H-chromene-3-carbaldehyde (31 mg, 0.08 mmol) obtained from Preparation Example 18-4 and piperidin-4-carboxylic acid ethyl ester hydrochloride (20 mg, 0.13 mmol) were used to obtain the title compound (11 mg, 25%).

NMR: $^1$H-NMR (500 HMz, CDCl$_3$); δ 7.70 (s, 1H), 7.46 (d, 1H), 7.40 (d, 1H), 6.85 (d, 1H), 6.48 (m, 2H), 6.23 (s, 1H), 5.10 (s, 2H), 4.72 (s, 2H), 4.20 (d, 2H), 4.14 (q, 2H), 2.98 (s, 2H), 2.83 (m, 2H), 2.26 (m, 1H), 1.95 (m, 2H), 1.86 (m, 2H), 1.72 (m, 2H), 1.25 (m, 1H), 1.23 (t, 3H), 0.57 (m, 2H), 0.40 (m, 2H)

Example 18: Synthesis of 1-[7-(3-chloro-1-cyclopropylmethyl-1H-indazol-5-ylmethoxy)-2H-chromene-3-ylmethyl]-piperidin-4-carboxylic acid

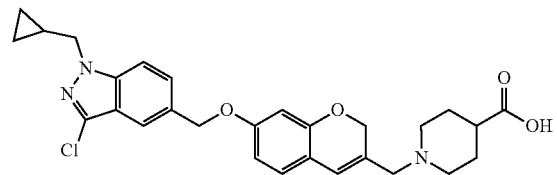 [SMILES: O=C(O)C1CCN(CC2=Cc3ccc(OCc4ccc5c(c4)c(Cl)nn5CC4CC4)cc3OC2)CC1]

According to the method described in Example 1, 1-[7-(3-chloro-1-cyclopropylmethyl-1H-indazol-5-ylmethoxy)-2H-chromene-3-ylmethyl]-piperidin-4-carboxylic acid ethyl ester (11 mg, 0.02 mmol) obtained from Preparation Example 18-5 was used to obtain the title compound (8 mg, 80%).

NMR: $^1$H-NMR (500 MHz, DMSO$_{d6}$); δ 7.67 (s, 1H), 7.43 (d, 1H), 7.37 (d, 1H), 6.88 (d, 1H), 6.50 (d, 1H), 6.44

(s, 1H), 6.39 (s, 1H), 5.07 (s, 2H), 4.79 (s, 2H), 4.16 (d, 2H), 3.35 (s, 2H), 3.19 (m, 2H), 2.34 (m, 3H), 2.03 (m, 2H), 1.91 (m, 2H), 1.25 (m, 1H), 0.56 (m, 2H), 0.38 (m, 2H)

Preparation Example 19-1: Synthesis of 1-cyclopentyl-1H-indazol-5-carboxylic acid methyl ester According to the method described in Preparation Example 3-2, 1H-indazol-5-carboxylic acid methyl ester (600 mg, 3.41 mmol) obtained from Preparation Example 3-1 and cyclopentyl bromide (1.1 me, 10.23 mmol) were used to obtain 1-cyclopentyl-1H-indazol-5-carboxylic acid methyl ester (450 mg, 53%).
NMR: $^1$H-NMR (500 HMz, CDCl$_3$); δ 8.49 (s, 1H), 8.08 (s, 1H), 8.02 (d, 1H), 7.44 (d, 1H), 4.99 (m, 1H), 3.93 (s, 3H), 2.18 (m, 4H), 1.97 (m, 2H), 1.75 (m, 2H)

Preparation Example 19-2: Synthesis of 3-chloro-1-cyclopentyl-1H-indazol-5-carboxylic acid methyl ester According to the method described in Preparation Example 3-3, 1-cyclopentyl-1H-indazol-5-carboxylic acid methyl ester (134 mg, 0.55 mmol) obtained from Preparation Example 19-1 was used to obtain the title compound (135 mg, 93%).

Preparation Example 19-3: Synthesis of (3-chloro-1-cyclopentyl-1H-indazol-5-yl)-methanol According to the method described in Preparation Example 3-4, 3-chloro-1-cyclopentyl-1H-indazol-5-carboxylic acid methyl ester (135 mg, 0.51 mmol) obtained from Preparation Example 19-2 was used to obtain the title compound (112 mg, 93%).

Preparation Example 19-4: Synthesis of 7-(3-chloro-1-cyclopentyl-1H-indazol-5-ylmethoxy)-5-fluoro-2H-chromene-3-carbaldehyde According to the method described in Preparation Example 3-5, (3-chloro-1-cyclopentyl-1H-indazol-5-yl)-methanol (88 mg, 0.35 mmol) obtained from Preparation Example 19-3 and 5-fluoro-7-hydroxy-2H-chromene-3-carbaldehyde (57 mg, 0.30 mmol) obtained from Preparation Example 12-1 were used to obtain the title compound (52 mg, 35%).

Preparation Example 19-5: Synthesis of 1-[7-(3-chloro-1-cyclopentyl-1H-indazol-5-ylmethoxy)-5-fluoro-2H-chromene-3-ylmethyl]-piperidin-4-carboxylic acid ethyl ester According to the method described in Preparation Example 1-4, 7-(3-chloro-1-cyclopentyl-1H-indazol-5-ylmethoxy)-5-fluoro-2H-chromene-3-carbaldehyde (52 mg, 0.12 mmol) obtained from Preparation Example 19-4 and piperidin-4-carboxylic ethyl ester hydrochloride (38 mg, 0.24 mmol) were used to obtain the title compound (40 mg, 58%).
NMR: $^1$H-NMR (500 HMz, CDCl$_3$); δ 7.66 (s, 1H), 7.42 (m, 2H), 6.41 (s, 1H), 6.25 (m, 2H), 5.06 (s, 2H), 4.90 (m, 1H), 4.72 (s, 2H), 4.11 (q, 2H), 3.00 (s, 2H), 2.82 (m, 2H), 2.15 (m, 1H), 2.13 (m, 4H), 1.97 (m, 4H), 1.86 (m, 2H), 1.72 (m, 4H), 1.24 (t, 3H)

Example 19: Synthesis of 1-[7-(3-chloro-1-cyclopentyl-1H-indazol-5-ylmethoxy)-5-fluoro-2H-chromene-3-ylmethyl]-piperidin-4-carboxylic acid

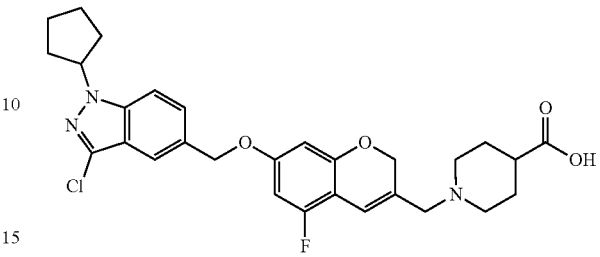

According to the method described in Example 1, 1-[7-(3-chloro-1-cyclopentyl-1H-indazol-5-ylmethoxy)-5-fluoro-2H-chromene-3-ylmethyl]-piperidin-4-carboxylic acid ethyl ester (40 mg, 0.07 mmol) obtained from Preparation Example 19-5 was used to obtain the title compound (31 mg, 81%).
NMR: $^1$H-NMR (500 HMz, DMSO$_d$s); δ 7.66 (s, 1H), 7.42 (m, 2H), 6.52 (s, 1H), 6.26 (m, 2H), 5.06 (s, 2H), 4.91 (m, 1H), 4.78 (s, 2H), 3.25 (s, 2H), 3.09 (m, 2H), 2.30 (m, 2H), 2.15 (m, 5H), 1.96 (m, 4H), 1.86 (m, 2H), 1.71 (m, 2H)

Preparation Example 20-1: Synthesis of 1-isobutyl-1H-indazol-5-carboxylic acid methyl ester According to the method described in Preparation Example 3-2, 1H-indazol-5-carboxylic acid methyl ester (1.9 g, 11.24 mmol) obtained from Preparation Example 3-1 and isobutyl iodide (2.6 me, 22.48 mmol) were used to obtain 1-isobutyl-1H-indazol-5-carboxylic acid methyl ester (1.2 g, 45%).

Preparation Example 20-2: Synthesis of 3-chloro-1-isobutyl-1H-indazol-5-carboxylic acid methyl ester According to the method described in Preparation Example 3-3, 1-isobutyl-1H-indazol-5-carboxylic acid methyl ester (1.2 g, 5.1 mmol) obtained from Preparation Example 20-1 was used to obtain the title compound (1.02 g, 75%).
NMR: $^1$H-NMR (500 HMz, CDCl$_3$); δ 8.36 (br, s, 1H), 8.02-8.00 (m, 1H), 7.32 (d, 1H), 4.06 (d, 2H), 3.89 (s, 3H), 2.31-2.24 (m, 1H), 0.87 (d, 6H)

Preparation Example 20-3: Synthesis of (3-chloro-1-isobutyl-1H-indazol-5-yl)-methanol According to the method described in Preparation Example 3-4, 3-chloro-1-isobutyl-1H-indazol-5-carboxylic acid methyl ester (691 mg, 2.59 mmol) obtained from Preparation Example 20-2 was used to obtain the title compound (560 mg, 91%).
NMR: $^1$H-NMR (500 HMz, CDCl$_3$); δ 7.55 (br, s, 1H), 7.37-7.34 (m, 1H), 7.27 (d, 1H), 4.71 (s, 2H), 4.02 (d, 2H), 3.15 (s, 1H), 2.27-2.21 (m, 1H), 0.85 (d, 6H)

Preparation Example 20-4: Synthesis of 7-(3-chloro-1-isobutyl-1H-indazol-5-ylmethoxy)-5-fluoro-2H-chromene-3-carbaldehyde According to the method described in Preparation Example 3-5, (3-chloro-1-isobutyl-1H-indazol-5-yl)-methanol (152 mg, 0.64 mmol) obtained from Preparation Example 20-3 and 5-fluoro-7-hydroxy-2H-chromene-3-carbaldehyde (124 mg, 0.64 mmol) obtained from Preparation Example 12-1 were used to obtain the title compound (84 mg, 32%).

NMR: $^1$H-NMR (500 HMz, CDCl$_3$); δ 9.52 (m, 1H), 7.69 (br, s, 1H), 7.45-7.35 (m, 3H), 6.36-6.31 (m, 2H), 5.12 (s, 2H), 5.00 (m, 2H), 4.10 (m, 2H), 2.34-2.29 (m, 1H), 0.90 (d, 6H)

Preparation Example 20-5: Synthesis of 1-[7-(3-chloro-1-isobutyl-1H-indazol-5-ylmethoxy)-5-fluoro-2H-chromene-3-ylmethyl]-piperidin-4-carboxylic acid ethyl ester According to the method described in Preparation Example 1-4, 7-(3-chloro-1-isobutyl-1H-indazol-5-ylmethoxy)-5-fluoro-2H-chromene-3-carbaldehyde (53 mg, 0.13 mmol) obtained from Preparation Example 20-4 and piperidin-4-carboxylic acid ethyl ester hydrochloride (30 mg, 0.19 mmol) were used to obtain the title compound (23 mg, 33%).

NMR: $^1$H-NMR (500 HMz, CDCl$_3$); δ 7.68 (s, 1H), 7.46-7.43 (m, 1H), 7.37 (d, 1H), 6.43 (s, 1H), 6.28-6.25 (m, 2H), 5.07 (s, 2H), 4.73 (s, 2H), 4.15-4.05 (m, 4H), 3.01 (s, 2H), 2.82 (d, 2H), 2.36-2.22 (m, 2H), 1.96 (t, 2H), 1.86 (d, 2H), 1.75-1.68 (m, 2H), 1.28-1.19 (m, 3H), 0.91 (d, 6H)

Example 20: Synthesis of 1-[7-(3-chloro-1-isobutyl-1H-indazol-5-ylmethoxy)-5-fluoro-2H-chromene-3-ylmethyl]-piperidin-4-carboxylic acid

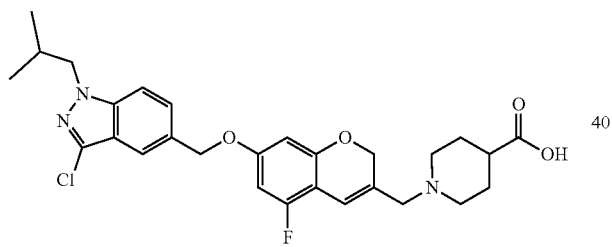

According to the method described in Example 1, 1-[7-(3-chloro-1-isobutyl-1H-indazol-5-ylmethoxy)-5-fluoro-2H-chromene-3-ylmethyl]-piperidin-4-carboxylic acid ethyl ester (23 mg, 0.04 mmol) obtained from Preparation Example 20-5 was used to obtain the title compound (21 mg, 93%).

NMR: $^1$H-NMR (500 HMz, DMSO$_{d6}$); δ 7.76 (d, 1H), 7.71 (s, 1H), 7.50 (d, 1H), 6.80 (s, 1H), 6.58-6.46 (m, 1H), 6.41 (s, 1H), 5.21-5.09 (m, 2H), 4.81 (s, 2H), 4.19-4.08 (m, 2H), 3.88-3.71 (m, 2H), 3.48-3.30 (m, 2H), 2.87 (m, 1H), 2.19-1.71 (m, 6H), 1.20-1.15 (m, 2H), 0.83-0.71 (m, 6H)

Preparation Example 21-1: Synthesis of 1-[7-(3-chloro-1-isobutyl-1H-indazol-5-ylmethoxy)-5-fluoro-2H-chromene-3-ylmethyl]-azepane-4-carboxylic acid ethyl ester According to the method described in Preparation Example 1-4, 7-(3-chloro-1-isobutyl-1H-indazol-5-ylmethoxy)-5-fluoro-2H-chromene-3-carbaldehyde (47 mg, 0.11 mmol) obtained from Preparation Example 20-4 and azepane-4-carboxylic acid ethyl ester hydrochloride (35 mg, 0.17 mmol) were used to obtain the title compound (40 mg, 62%).

NMR: $^1$H-NMR (500 HMz, CDCl$_3$); δ 7.68 (s, 1H), 7.46-7.43 (m, 1H), 7.37 (d, 1H), 6.42 (s, 1H), 6.28-6.24 (m, 2H), 5.07 (s, 2H), 4.74 (s, 2H), 4.13-4.05 (m, 5H), 3.14 (s, 2H), 2.75-2.48 (m, 4H), 2.35-2.28 (m, 1H), 2.03-1.71 (m, 5H), 1.58 (br, s, 1H), 1.24 (t, 3H), 0.91 (d, 6H)

Example 21: Synthesis of 1-[7-(3-chloro-1-Isobutyl-1H-indazol-5-ylmethoxy)-5-fluoro-2H-chromene-3-ylmethyl]-azepane-4-carboxylic acid

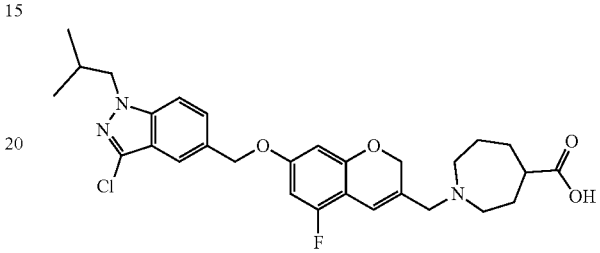

According to the method described in Example 1, 1-[7-(3-chloro-1-isobutyl-1H-indazol-5-ylmethoxy)-5-fluoro-2H-chromene-3-ylmethyl]-azepane-4-carboxylic acid ethyl ester (40 mg, 0.07 mmol) obtained from Preparation Example 21-1 was used to obtain the title compound (31 mg, 82%).

NMR: $^1$H-NMR (500 HMz, DMSO$_{d6}$); δ 7.76 (d, 1H), 7.71 (s, 1H), 7.50 (d, 1H), 6.83 (s, 1H), 6.58-6.52 (m, 1H), 6.40 (s, 1H), 5.18 (s, 2H), 4.84 (s, 2H), 4.18-4.12 (m, 2H), 3.83 (s, 2H), 3.33-2.82 (m, 4H), 2.59 (br, s, 1H), 2.16-1.65 (m, 6H), 1.31-1.05 (m, 2H), 0.81 (d, 6H)

Experimental Example: Evaluation of $Ca^{2+}$ Inducing Ability of a Test Compound Using a Cell Line Expressing Human Sphingosine-1-Phosphate (1) Test Method: $EC_{50}$ It is a functional test method in which a therapeutic efficacy of an agonist compound is determined by an increase in calcium in CHO (Chinese hamster ovary) cells, which overexpress human sphingosine-1-phosphate 1 receptor (S1P1 receptor) that react with sphingosine-1-phosphate (S1P). S1P is a G-protein coupled receptor (GPCR) coupled to Gi protein that reacts with the S1P1 receptor and increases intracellular calcium concentration. CHO-K1 cells, which are used for preparing a stable cell line, show no change in the calcium concentration by S1P, and thus they are good for checking signals from human S1P receptors after transfecting the cells with each subtype of the receptors.

To prepare CHO cells which overexpress human S1P1-S1P5, human clones for each subtype having HA at the N terminal residue (S1P1: EDG010 TN00, S1P2: EDG020TN00, S1P3: EDG030TN00, S1P4: EDG060TN00, S1P5: EDG080TN00) were purchased from Missouri S&T cDNA Resource Center and co-transfected with G-protein alpha subunit (G-alpha-16) into CHO-K1 cells. After separating cells by fluorescence-activated cell sorting (FACS, LK BioScience, JSAN) using HA-antibodies (MACS, Anti-HA-PE), they were selectively cultured in the medium with 10% FBS (Gibco, USA), 0.5 mg/mL Geneticin (Gibco) and 0.2 mg/mL Hygromycin B F12 (Gibco) to obtain the desired cells.

A calcium measurement kit (Calcium 5 assay kit, Molecular Devices) was used to select an agonist compound. The principle of calcium measurement is that calcium-sensitive dyes are applied to cells, they enter into the cytoplasm of the cells during incubation, and when a ligand binds to a certain receptor to release calcium into the cytoplasm, the dyes bind to said calcium to induce fluorescence which is measured. This test method can sensitively measure only the intracellular calcium concentration change because any change that may occur outside the cells is masked by a masking dye.

The experimental procedure was as follows. One day before calcium measurement, CHO cells overexpressing hS1P1-hS1P5 were dispensed into a 96-well plate (bottom clear black well) in $3 \times 10^4$ cells per well and cultured at 37° C. under 5% carbon dioxide condition for one day. 100 μl of calcium dyes mixed with Assay Buffer (1×HBSS, 20 mM HEPES, 2.5 mM probenecid, pH 7.4) were dispensed into culture solution in well and cultured at 37° C. for one hour. Test compounds were dissolved in 100% DMSO to prepare 1 μl solution per each concentration, and each solution was mixed with 199 μl Assay Buffer such that the concentrations were 50, 5, 0.5, 0.05, 0.005, and 0.0005 μM. The plate cultured with the calcium dyes was put into FlaxstationII (Molecular Devices), and the prepared test compounds (the final concentrations of the test compounds: 10, 1, 0.1, 0.01, 0.001 and 0.0001 μM) were programmed to be automatically inoculated in 50 μl per each well. For a total of 90 seconds, relative fluorescence unit (RFU) values were measured. The value of Reference (S1P substance 1 μM) deducting the blank value was set as 100%, and $EC_{50}$ values of the test compounds were calculated by prism.

(2) Results

The results are shown as $EC_{50}$ (nM) in Table 1 below.

TABLE 1

| Classification | $EC_{50}$ (nM) |
|---|---|
| Example 1 | 4.07 |
| Example 2 | 2.09 |
| Example 3 | 70.79 |
| Example 4 | 9.12 |
| Example 5 | 10.96 |
| Example 6 | 12.88 |
| Example 7 | 5.75 |
| Example 8 | 6.31 |
| Example 9 | 14.45 |
| Example 10 | 2.75 |
| Example 11 | 8.32 |
| Example 12 | 14.45 |
| Example 13 | 17.38 |
| Example 14 | 12.02 |
| Example 15 | 6.31 |
| Example 16 | 43.65 |
| Example 17 | 20.89 |
| Example 18 | 64.57 |
| Example 19 | 70.79 |
| Example 20 | 5.13 |
| Example 21 | 14.45 |

As shown in Table 1 above, the S1P receptor agonist compounds according to the present invention exhibited excellent activities.

The invention claimed is:

1. A compound represented by Formula 1, a pharmaceutically acceptable salt, or a stereoisomer thereof:

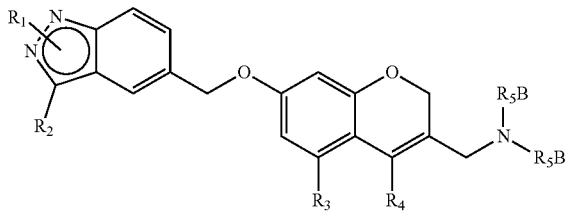

[Formula 1]

wherein
$R_1$ is hydrogen, or a substituted or unsubstituted alkyl, alkenyl, or alkynyl;
$R_2$ is hydrogen, a substituted or unsubstituted alkyl, halogen, CN, $CF_3$, or $COCF_3$;
$R_3$ and $R_4$ are each independently hydrogen, a substituted or unsubstituted alkyl, alkenyl, alkynyl, or halogen;
$R_5A$ and $R_5B$ are each independently hydrogen, a substituted or unsubstituted alkyl, alkenyl, alkynyl, or —$R_6$ (COOH), wherein $R_6$ is a single bond, a substituted or unsubstituted alkylene, alkenylene, or alkynylene, and any one of $R_5A$ and $R_5B$ is-$R_6$ (COOH); and optionally $R_5A$ and $R_5B$ bind to each other to form a ring, which is substituted with —$R_6$ (COOH).

2. The compound of claim 1, a pharmaceutically acceptable salt, or a stereoisomer thereof, wherein
$R_1$ is hydrogen or a substituted or unsubstituted alkyl;
$R_2$ is hydrogen, a substituted or unsubstituted alkyl, halogen, or $CF_3$;
$R_3$ and $R_4$ are each independently hydrogen, an unsubstituted alkyl, or halogen;
$R_5A$ and $R_5B$ are each independently a substituted or unsubstituted alkyl or —$R_6$ (COOH), wherein $R_6$ is a single bond or a substituted or unsubstituted alkylene, and any one of $R_5A$ and $R_5B$ is-$R_6$ (COOH); and optionally
$R_5A$ and $R_5B$ bind to each other to form a ring, which is substituted with —$R_6$ (COOH).

3. The compound of claim 1, a pharmaceutically acceptable salt, or a stereoisomer thereof, wherein
when $R_5A$ and $R_5B$ bind to each other to form a ring, the ring is additionally substituted with one or more substituents selected from the group consisting of halogen, an alkyl, and halogeno-alkyl.

4. The compound of claim 1, a pharmaceutically acceptable salt, or a stereoisomer thereof, wherein
when $R_5A$ and $R_5B$ bind to each other to form a ring, the ring is represented by Formula 1-1:

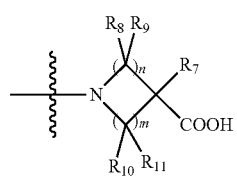

[Formula 1-1]

wherein N is the same as N bound to R5A and R5B in Formula 1;
R7 to R11 are each independently hydrogen, a substituted or unsubstituted alkyl, halogen, or halogeno-alkyl; and
m and n are each independently an integer between 0 and 6, and m+n is ≥1.

5. The compound of claim 4, a pharmaceutically acceptable salt, or a stereoisomer thereof, wherein the ring is represented by Formula 1-2:

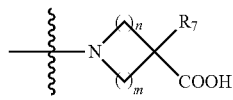

[Formula 1-2]

wherein
$R_7$ is hydrogen, a substituted or unsubstituted alkyl, or halogeno-alkyl; and
N, n and m are as defined in claim 4.

6. The compound of claim 1, a pharmaceutically acceptable salt, or a stereoisomer thereof, wherein at least one of $R_3$ and $R_4$ is hydrogen.

7. The compound of claim 1, a pharmaceutically acceptable salt, or a stereoisomer thereof, wherein the compound represented by Formula 1 is a compound selected from the following group:
{[7-(3-chloro-1-isopropyl-1H-indazol-5-yl methoxy)-2H-chromene-3-ylmethyl]-methyl-amino}-acetic acid;
1-[7-(3-chloro-1-isopropyl-1H-indazol-5-yl methoxy)-2H-chromene-3-ylmethyl]-azetidin-3-carboxylic acid;
1-[7-(3-chloro-2-propyl-2H-indazol-5-yl methoxy)-2H-chromene-3-ylmethyl]-azetidin-3-carboxylic acid;
1-[7-(3-chloro-1-isopropyl-1H-indazol-5-yl methoxy)-2H-chromene-3-ylmethyl]-piperidine-4-carboxylic acid;
(R)-1-[7-(3-chloro-1-isopropyl-1H-indazol-5-yl methoxy)-2H-chromene-3-ylmethyl]-piperidine-3-carboxylic acid;
(S)-1-[7-(3-chloro-1-isopropyl-1H-indazol-5-yl methoxy)-2H-chromene-3-ylmethyl]-piperidine-3-carboxylic acid;
(S)-1-[7-(3-chloro-1-isopropyl-1H-indazol-5-yl methoxy)-2H-chromene-3-ylmethyl]-pyrrolidine-3-carboxylic acid;
1-[7-(3-chloro-1-isopropyl-1H-indazol-5-yl methoxy)-2H-chromene-3-ylmethyl]-3-chloromethyl-azetidine-3-carboxylic acid;
(R)-1-[7-(3-chloro-1-isopropyl-1H-indazol-5-yl methoxy)-2H-chromene-3-ylmethyl]-pyrrolidine-3-carboxylic acid;
1-[7-(3-chloro-1-isopropyl-1H-indazol-5-yl methoxy)-4-methyl-2H-chromene-3-ylmethyl]-piperidine-4-carboxylic acid;
1-[4-chloro-7-(3-chloro-1-isopropyl-1H-indazol-5-yl methoxy)-2H-chromene-3-ylmethyl]-piperidine-4-carboxylic acid;
1-[7-(3-chloro-1-isopropyl-1H-indazol-5-yl methoxy)-5-fluoro-2H-chromene-3-ylmethyl]-piperidine-4-carboxylic acid;
1-[7-(1-isopropyl-3-trifluoromethyl-1H-indazol-5-yl methoxy)-2H-chromene-3-ylmethyl]-piperidine-4-carboxylic acid;
1-[7-(1-isopropyl-3-ethyl-1H-indazol-5-yl methoxy)-2H-chromene-3-ylmethyl]-piperidine-4-carboxylic acid;
1-[7-(3-chloro-1-isopropyl-1H-indazol-5-yl methoxy)-2H-chromene-3-ylmethyl]-azepane-4-carboxylic acid;
1-[7-(3-chloro-1-propyl-1H-indazol-5-yl methoxy)-2H-chromene-3-ylmethyl]-azetidine-3-carboxylic acid;
1-[7-(3-chloro-1-propyl-1H-indazol-5-yl methoxy)-2H-chromene-3-ylmethyl]-piperidine-4-carboxylic acid;
1-[7-(3-chloro-1-cyclopropylmethyl-1H-indazol-5-yl methoxy)-2H-chromene-3-ylmethyl]-piperidine-4-carboxylic acid;
1-[7-(3-chloro-1-cyclopentyl-1H-indazol-5-yl methoxy)-5-fluoro-2H-chromene-3-ylmethyl]-piperidine-4-carboxylic acid;
1-[7-(3-chloro-1-isobutyl-1H-indazol-5-yl methoxy)-5-fluoro-2H-chromene-3-ylmethyl]-piperidine-4-carboxylic acid;
1-[7-(3-chloro-1-isobutyl-1H-indazol-5-yl methoxy)-5-fluoro-2H-chromene-3-ylmethyl]-azepane-4-carboxylic acid; and
2-{1-[7-(1-isopropyl-3-trifluoromethyl-1H-indazol-5-ylmethoxy)-2H-chromene-3-ylmethyl]-piperidine-4-yl}acetic acid.

8. The compound of claim 1, a pharmaceutically acceptable salt, or a stereoisomer thereof, wherein the compound represented by Formula 1 is a sphingosine-1-phosphate receptor agonist.

9. A pharmaceutical composition for treating or preventing immunoregulatory disorders, the composition comprising the compound of claim 1, a pharmaceutically acceptable salt, or a stereoisomer thereof.

10. A pharmaceutical composition for treating or preventing autoimmune diseases or chronic inflammatory diseases selected from the group consisting of systemic lupus erythematosus, chronic rheumatoid arthritis, inflammatory bowel diseases, multiple sclerosis, amyotrophic lateral sclerosis (ALS), arteriosclerosis, atherosclerosis, scleroderma and autoimmune hepatitis, the pharmaceutical composition comprising the compound of claim 1, a pharmaceutically acceptable salt, or a stereoisomer thereof as an active ingredient.

11. The compound of claim 4, a pharmaceutically acceptable salt, or a stereoisomer thereof, wherein the ring is any one of azetidine, pyrrolidine, piperidine, or azepane.

12. A method for treating or preventing immunoregulatory disorders, comprising administering to a subject in need thereof a therapeutically effective amount of the pharmaceutical composition of claim 9.

13. A method for treating or preventing autoimmune diseases or chronic inflammatory diseases, comprising administering to a mammal in need thereof a therapeutically effective amount of the pharmaceutical composition of claim 10, wherein the autoimmune diseases or chronic inflammatory diseases are selected from the group consisting of systemic lupus erythematosus, chronic rheumatoid arthritis, inflammatory bowel diseases, multiple sclerosis, amyotrophic lateral sclerosis (ALS), arteriosclerosis, atherosclerosis, scleroderma and autoimmune hepatitis.

* * * * *